United States Patent
Kimura et al.

(10) Patent No.: US 7,908,446 B2
(45) Date of Patent: Mar. 15, 2011

(54) COPY SYSTEM AND METHOD USING DIFFERENTIAL BITMAP

(75) Inventors: Hidehiko Kimura, Odawara (JP); Masaki Aizawa, Odawara (JP); Fumio Yamaguchi, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 557 days.

(21) Appl. No.: 11/968,272

(22) Filed: Jan. 2, 2008

(65) Prior Publication Data

US 2008/0229038 A1   Sep. 18, 2008

(30) Foreign Application Priority Data

Mar. 16, 2007   (JP) .................................. 2007-069235

(51) Int. Cl.
*G06F 12/16* (2006.01)
(52) U.S. Cl. .......................................... 711/162; 711/161
(58) Field of Classification Search ........................ None
See application file for complete search history.

(56) References Cited

U.S. PATENT DOCUMENTS

| | | | | |
|---|---|---|---|---|
| 5,544,347 A | * | 8/1996 | Yanai et al. | ................... 711/162 |
| 5,852,724 A | * | 12/1998 | Glenn et al. | ................... 709/239 |
| 6,141,773 A | * | 10/2000 | St. Pierre et al. | ................ 714/20 |
| 2001/0049749 A1 | | 12/2001 | Katsuragi et al. | |
| 2005/0228957 A1 | * | 10/2005 | Satoyama et al. | ............ 711/162 |
| 2006/0218203 A1 | | 9/2006 | Yamato et al. | |
| 2007/0050573 A1 | * | 3/2007 | Arakawa et al. | ............... 711/162 |
| 2007/0113004 A1 | * | 5/2007 | Sugimoto et al. | ............. 711/112 |
| 2008/0052480 A1 | * | 2/2008 | Satoyama et al. | ............. 711/162 |

FOREIGN PATENT DOCUMENTS

| | | |
|---|---|---|
| JP | 2001-337939 | 12/2001 |
| JP | 2005-141381 | 6/2005 |
| JP | 2006-268740 | 10/2006 |

\* cited by examiner

*Primary Examiner* — Than Nguyen
(74) *Attorney, Agent, or Firm* — Brundidge & Stanger, P.C.

(57) ABSTRACT

Proposed are a copy system and a copy method capable of performing initial copy in a short amount of time and with high reliability. On a primary side, the area in the first volume to which data was written from the host is managed, a second bitmap is created reflecting the contents of the first bitmap, and the second bitmap is sent to the secondary side on the primary side. On a secondary side, a third bitmap to which the second bitmap sent from the primary-side is merged is created, on the primary side, only the valid data containing data written by the host in the first volume is copies to the second volume based on the second bitmap, and, on the secondary-side, the differential between the first and second volumes during the initial copy is managed based on the third bitmap.

10 Claims, 15 Drawing Sheets

FIG.3

| CU#DEV# | UPDATE BM SETTING | UPDATE BM STATUS | THRESHOLD AREA TOP POSITION | THRESHOLD AREA END POSITION |
|---|---|---|---|---|
| 0000 | YES | VALID | WWWWWW | XXXXXX |
| 0001 | NO | - | - | - |
| 0002 | YES | INVALID | - | - |
| 0003 | YES | VALID | YYYYYY | ZZZZZZ |
| . | . | . | . | . |
| . | . | . | . | . |
| . | . | . | . | . |

23A  23B  23C  23D  23E

21A(21B)

|  | VALID DATA COPY | DATA GUARANTEE COPY | CONVENTIONAL COPY |
|---|---|---|---|
| COPY RANGE | VALID DATA | ALL AREAS | ALL AREAS |
| DATA GUARANTEE PROCESSING | YES | YES | NO |

FIG.10

| No. | COPY SETTING | | UPDATE BM SETTING | | COPY METHOD |
|---|---|---|---|---|---|
| | COPY TYPE | ALTERNATE COPY METHOD | YES/NO | VALID/INVALID | |
| 1 | VALID DATA COPY | DATA GUARANTEE COPY | YES | VALID | VALID DATA COPY |
| 2 | | | | INVALID | DATA GUARANTEE COPY |
| 3 | | | NO | - | DATA GUARANTEE COPY |
| 4 | | CONVENTIONAL COPY | YES | VALID | VALID DATA COPY |
| 5 | | | | INVALID | DATA GUARANTEE COPY |
| 6 | | | NO | - | CONVENTIONAL COPY |
| 7 | CONVENTIONAL COPY | - | - | - | CONVENTIONAL COPY |

COPY SYSTEM AND METHOD USING DIFFERENTIAL BITMAP

CROSS REFERENCES

This application relates to and claims priority from Japanese Patent Application No. 2007-69235, filed on Mar. 16, 2007, the entire disclosure of which is incorporated herein by reference.

BACKGROUND

The present invention relates to a copy system and a copy method, and, for example, can be suitably applied to a storage system.

From the past, remote copy of copying data written in a logical volume of a storage apparatus set as a primary side (this is hereinafter referred to as the "primary storage apparatus") to a logical volume of a storage apparatus set as a secondary side has been widely employed.

In remote copy, after setting a copy pair with a logical volume of the copy source in the primary storage apparatus as a primary volume, and a logical volume of the copy destination in the secondary storage apparatus as a secondary volume, all areas of the primary volume are copied to the secondary volume (this is hereinafter referred to as the "initial copy"). Subsequently, when new data is written in the primary volume, such data is transferred from the primary storage apparatus to the secondary storage apparatus synchronously or asynchronously with the writing of data so as to write this data in the same location as the primary volume in the secondary volume. According to this kind of remote copy, it is possible to mirror and retain data, and prevent the loss of data caused by disasters or the like.

Incidentally, Japanese Patent Laid-Open Publication No. 2005-141381 (Patent Document 1) and Japanese Patent Laid-Open Publication No. 2001-337939 (Patent Document 2) describe a remote copy method in a case when a secondary storage apparatus succeeds the operations of a primary storage apparatus for maintenance or other reasons, including the steps of managing the differential between the primary volume and the secondary volume with a differential bitmap, and, when resuming the operations of the primary storage apparatus, using this differential bitmap to copy only the differential from the secondary volume to the primary volume.

Further, Japanese Patent Laid-Open Publication No. 2006-268740 (Patent Document 3) describes a remote copy method, including the steps of creating a backup of a primary volume, copying such backup to a secondary volume, managing the update of the primary volume after the creation of a backup with a differential bitmap, copying the backup data to the secondary volume, and using a differential bitmap to copy only the differential from the primary volume to the secondary volume.

SUMMARY

Meanwhile, the number of volumes and the volume capacity in storage apparatuses in recent years are ever-increasing. Consequently, the time required to perform the initial copy is increasing, and much time is required for the initial copy to be performed prior to the remote copy.

Thus, by applying the technology of copying only the differential (differential copy) disclosed in foregoing Patent Document 1 to Patent Document 3 in performing the initial copy, the time required for the initial copy can be shortened.

Nevertheless, in foregoing Patent Document 1 to Patent Document 3, the differential data between the primary volume and the secondary volume is merely sent unilaterally from the copy source to the copy destination, and it is not possible to confirm whether the differential data is accurately reflected in the primary volume of the copy destination (Patent Document 1 and Patent Document 2) or the secondary volume of the copy destination (Patent Document 3).

Therefore, even if the technology of differential copy disclosed in Patent Document 1 to Patent Document 3 is applied to the initial copy as is, there is a problem in that the initial copy cannot be performed with high reliability.

The present invention was made in view of the foregoing points. Thus, an object of the present invention is to propose a copy system and a copy method capable of performing initial copy in a short amount of time and with high reliability.

In order to achieve the foregoing object, the present invention provides a copy system for copying data written from a host into a first volume on a primary side to a second volume on a secondary side synchronously or asynchronously with the writing of data. This copy system comprises a first control unit provided to the primary side for using a first bitmap to manage the area in the first volume to which data was written from the host, creating a second bitmap reflecting the contents of the first bitmap during the initial copy that matches the contents of the first and second volumes to be performed prior to the copy, sending the second bitmap to the secondary side, and copying to the second volume only the valid data containing data written by the host in the first volume based on the second bitmap, and a second control unit provided to the secondary side for creating a third bitmap to which the second bitmap sent from the primary side is merged, and managing the differential between the first and second volumes during the initial copy based on the third bitmap.

Thereby, with this copy system, it is possible to determine the status of valid data that has not been copied to the second volume based on a third bitmap.

The present invention further provides a copy method for copying data written from a host into a first volume on a primary side to a second volume on a secondary side synchronously or asynchronously with the writing of the data. This copy method comprises a first step on the primary side of using a first bitmap to manage the area in the first volume to which data was written from the host, a second step on the primary side of creating a second bitmap reflecting the contents of the first bitmap during the initial copy that matches the contents of the first and second volumes to be performed prior to the copy, and sending the second bitmap to the secondary side on the primary side, and on the secondary side of creating a third bitmap to which the second bitmap sent from the primary side is merged, and a third step on the primary-side of copying to the second volume only the valid data containing data written by the host in the first volume based on the second bitmap, and on the secondary side of managing the differential between the first and second volumes during the initial copy based on the third bitmap.

Thereby, with this copy method, it is possible to determine the status of valid data that has not been copied to the second volume based on a third bitmap.

According to the present invention, it is possible to effectively prevent the copy omission of valid data, and thereby realize a copy system and a copy method capable of performing initial copy in a short amount of time and with high reliability.

DESCRIPTION OF DRAWINGS

FIG. 3 is a conceptual diagram showing an update bitmap management table;

FIG. 10 is a chart explaining the initial copy method;

DETAILED DESCRIPTION

An embodiment of the present invention is now explained in detail with reference to the attached drawings.

(1) Configuration of Storage System in Present Embodiment

Figure 1:
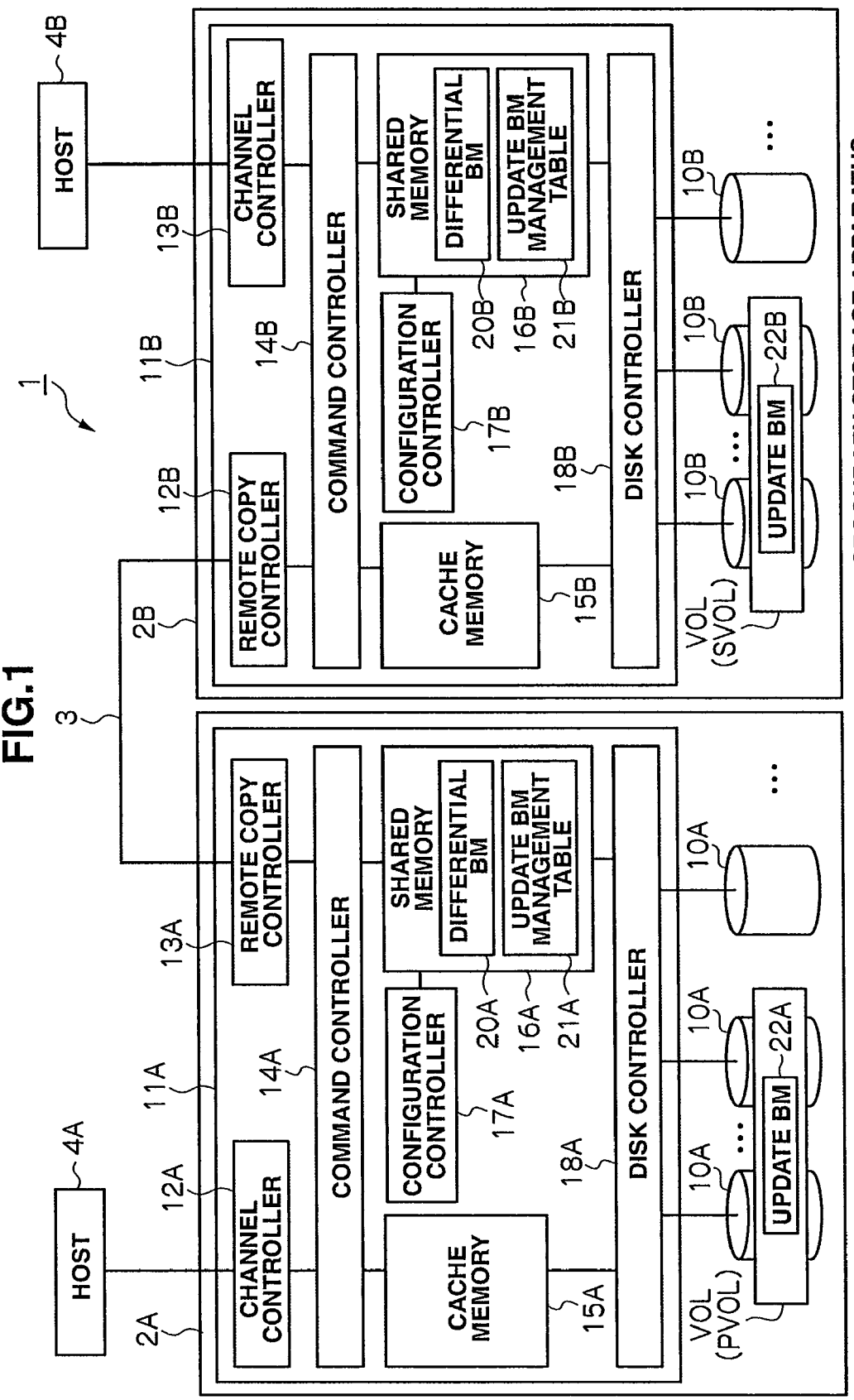
FIG. 1 is a block diagram showing the overall configuration of a storage system according to an embodiment of the present invention.

FIG. 1 shows the overall storage system 1 according to the present embodiment. The storage system 1 is configured by two storage apparatuses 2A, 2B equipped with the remote copy function being connected via a remote copy path 3, and the hosts 4A, 4B being connected to the two storage apparatuses 2A, 2B, respectively.

Each storage apparatus 2A, 2B comprises a plurality of disk devices 10A, 10B that provide storage areas for storing data, and control units 11A, 11B for controlling the disk devices 10A, 10B.

Each disk device 10A, 10B is configured, for example, from an expensive disk such as a SCSI (Small Computer System Interface) disk, or an inexpensive disk such as a SATA (Serial AT Attachment) disk or an optical disk. The disk devices 10A, 10B are operated by the control units 11A, 11B according to a RAID (Redundant Array of Inexpensive Disks) system. Incidentally, as the disk devices 10A, 10B, for instance, a semiconductor memory such as a flash memory may also be used.

One or more logical volumes VOL are established on a physical storage area provided by one or more disk devices 10A, 10B, and data is read from and written into the logical volumes VOL in block units of a prescribed size.

Each logical volume VOL is allocated a unique volume ID (for instance, a LUN (Logical Unit Number)). In the case of this embodiment, access to data stored in the storage apparatuses 2A, 2B is conducted by combining the volume ID and a unique block ID number (for instance, an LBA (Logical Block Address)) to be allocated to each block as the address, and designating this address.

The control units 11A, 11B comprise channel controllers 12A, 12B, remote copy controllers 13A, 13B, command controllers 14A, 14B, cache memories 15A, 15B, shared memories 16A, 16B, configuration controllers 17A, 17B and disk controllers 18A, 18B.

The channel controllers 12A, 12B interface with the hosts 4A, 4B and perform protocol control during communication with the hosts 4A, 4B. Based on the protocol control function of the channel controllers 12A, 12B, data and commands can be sent and received between the hosts 4A, 4B and the storage apparatuses 2A, 2B according to an FC protocol, an iSCSI protocol, or a TCP/IP (Transmission Control Protocol/Internet Protocol) protocol.

The remote copy controllers 13A, 13B execute various types of control processing concerning remote copy as described later by coordinating with the remote copy controllers 13B, 13A in the storage apparatuses 2B, 2A connected via the remote copy path 3.

The command controllers 14A, 14B control the various types of command processing according to commands from the hosts 4A, 4B received via the channel controllers 12A, 12B, and the transfer of data between the channel controllers 12A, 12B and the cache memories 15A, 15B, and between the remote copy controllers 13A, 13B and the cache memories 15A, 15B.

The cache memories 15A, 15B, for example, are configured from a volatile memory such as an SDRAM (Synchronous Dynamic Random Access Memory), and are primarily used for temporarily storing the write-target data or read-target data to be sent and received between the channel controllers 12A, 12B or remote copy controllers 13A, 13B and the disk controllers 18A, 18B.

The shared memories 16A, 16B store various control programs for controlling the operation of the storage apparatuses 2A, 2B, and various types of management information concerning the storage apparatuses 2A, 2B. The shared memories 16A, 16B also store the differential bitmaps 20A, 20B and the update bitmap management tables 21A, 21B described later.

The configuration controllers 17A, 17B have a function for reading and writing control programs and various types of management information from and into the shared memories 16A, 16B, and also have the function for partially creating management information and storing it in the shared memories 16A, 16B.

The disk controllers 18A, 18B act as an interface for sending and receiving data to and from the disk devices 10A, 10B. The disk controllers 18A, 18B, according to commands from the command controllers 14A, 14B, perform processing for writing write-target data in the disk devices 10A, 10B and reading read-target data from the disk devices 10A, 10B. When inputting and outputting data to and from the disk devices 10A, 10B, the disk controllers 18A, 18B convert the logical address designated by the hosts 4A, 4B into a physical address. Further, the disk controllers 18A, 18B perform data access according to the set RAID level when the disk devices 10A, 10B are managed based on a RAID system.

The remote copy path 3, for instance, is configured from an FC cable, a LAN, a SAN or a dedicated line. Communication between the storage apparatuses 2A, 2B via the remote copy path 3, for instance, is conducted according to a fibre channel protocol when the remote copy path 3 is an FC cable or a SAN, and conducted according to a TCP/IP (Transmission Control Protocol/Internet Protocol) protocol when the remote copy path 3 is a LAN.

The hosts 4A, 4B are computer devices comprising a CPU, a memory and so on. Various functions are realized as a result of the CPU provided to the hosts 4A, 4B executing the various programs stored in the memory. The hosts 4A, 4B, for example, are configured from a personal computer, a workstation, a mainframe computer or the like.

(2) Remote Copy Function of Present Embodiment (2-1) Outline

The remote copy function loaded in the storage apparatuses 2A, 2B is now explained.

In the case of this embodiment, the storage apparatuses 2A, 2B are equipped with valid data copy, in addition to conventional copy, as the copy method of initial copy to be performed prior to the remote copy between the storage apparatuses 2A, 2B. Incidentally, in the ensuing explanation, the storage apparatus 2A shall be the primary side of remote copy and the storage apparatus 2B shall be the secondary side of remote copy, and the storage apparatus 2A will be referred to as a primary storage apparatus 2A and the storage apparatus 2B will be referred to as a secondary storage apparatus 2B. Moreover, in the ensuing explanation, the logical volume VOL to become the primary side of remote copy in the primary storage apparatus 2A will be referred to as a primary volume PVOL, and the logical volume VOL to become the secondary side of remote copy in the secondary storage apparatus 2B will be referred to as a secondary volume SVOL.

Conventional copy, as with conventional initial copy, is a copy method of copying all data in the primary volume PVOL to the secondary volume SVOL. Further, valid data copy is a copy method of copying only data (this is hereinafter referred to as "valid data") in the primary volume PVOL written by the host 4A to the secondary volume SVOL (this is hereinafter referred to as "valid data copy").

Figure 2:
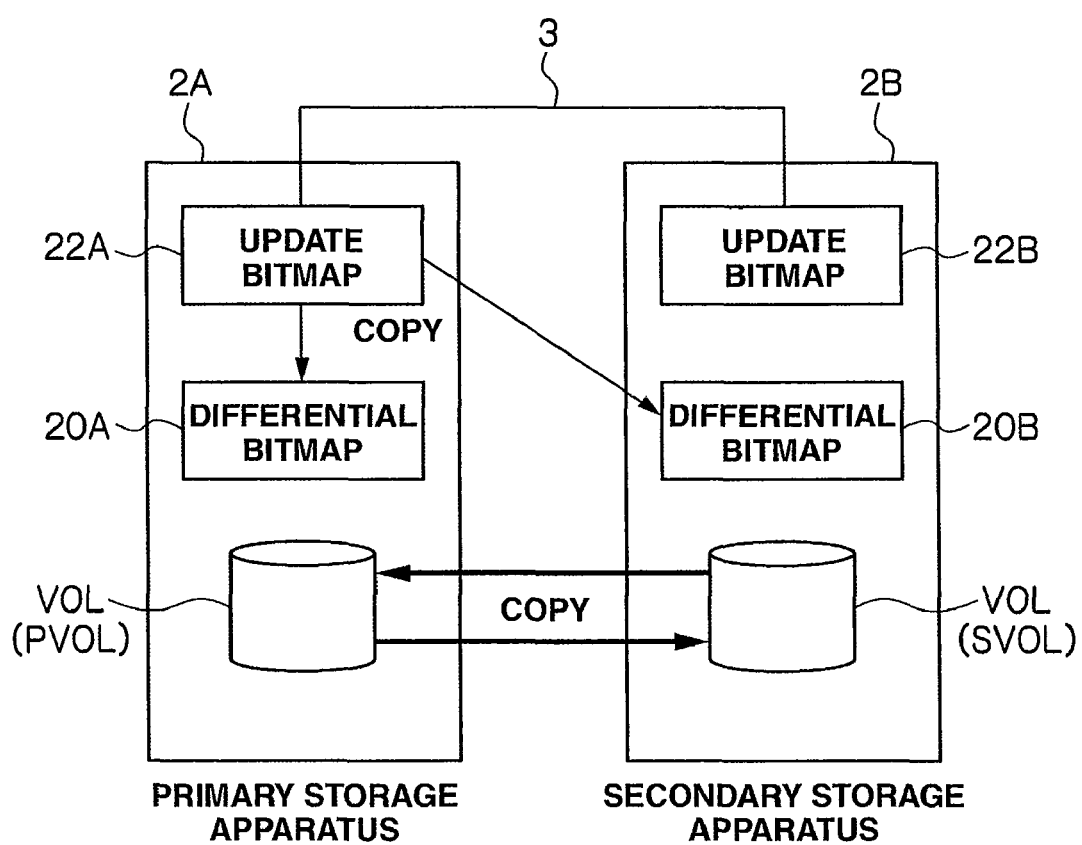
FIG. 2 is a conceptual diagram explaining the outline of the remote copy function according to an embodiment of the present invention.

In order to accommodate the initial copy based on such valid data copy, as shown in FIG. 2, the primary storage apparatus 2A and the secondary storage apparatus 2B set update bitmaps 22A, 22B, which are for managing the areas in the logical volume VOL to which valid data was written by the hosts 4A, 4B, in the logical volume VOL upon creating a logical volume VOL in the self storage apparatus regarding the logical volume designated by a user. When data from the hosts 4A, 4B is written in any of the areas in the logical volume VOL, the primary storage apparatus 2A and the secondary storage apparatus 2B record the fact that data has been written in such area in the update bitmaps 22A, 22B (in other words, they turn on the bit in the update bitmaps 22A, 22B corresponding to that area).

Meanwhile, when a command (hereinafter referred to as the "copy pair formation command") is thereafter given from the host 4A to the primary storage apparatus 2A that designates the primary volume PVOL and the secondary volume SVOL for forming a copy pair, the primary storage apparatus 2A and the secondary storage apparatus 2B create differential bitmaps 20A, 20B respectively merged with the update bitmap 22A of the primary volume PVOL in the respective shared memories 16A, 16B of the primary storage apparatus 2A and the secondary storage apparatus 2B.

Subsequently, the primary storage apparatus 2A and the secondary storage apparatus 2B execute initial copy for sequentially copying only the valid data in the primary volume PVOL to the secondary volume SVOL based on the differential bitmaps 20A, 20B. Thereupon, the primary storage apparatus 2A and the secondary storage apparatus 2B respectively manage the areas that were subject to initial copy in the primary volume PVOL or the secondary volume SVOL based on the differential bitmaps 20A, 20B. Specifically, the primary storage apparatus 2A and the secondary storage apparatus 2B respectively turn off the bit associated with an area in the differential bitmaps 20A, 20B each time they copy the valid data from the primary volume PVOL to such corresponding area in the secondary volume SVOL. Further, when there is an update bitmap 22B of the secondary volume SVOL, the secondary storage apparatus 2B turns on the bit associated with the area in such update bitmap 22B in addition to updating the differential bitmap 20B.

When the secondary storage apparatus 2B completes the initial copy based on valid data copy, it sends the self storage apparatus-side differential bitmap 20B to the primary storage apparatus 2A. Further, the primary storage apparatus 2A verifies whether there is valid data that has not been copied to the secondary volume SVOL based on the secondary storage apparatus 2B-side differential bitmap 20B. When the foregoing valid data exists, the primary storage apparatus 2A re-copies the valid data to the secondary volume SVOL.

Moreover, when erase processing is set in advance regarding such primary volume PVOL, the primary storage apparatus 2A notifies this to the secondary storage apparatus 2B. When the secondary storage apparatus 2B receives this notice, it executes erase processing of initializing the unupdated area to which the valid data in the secondary volume SVOL was not copied.

(2-2) Configuration of Update Bitmap Management Table

As a means for realizing the foregoing valid data copy, as shown in FIG. 1, each shared memory 16A, 16B of the primary storage apparatus 2A and the secondary storage apparatus 2B stores update bitmap management tables 21A, 21B, respectively.

The update bitmap management tables 21A, 21B are tables for uniformly managing the update bitmaps 22A, 22B of the respective logical volumes VOL formed in the primary storage apparatus 2A or the secondary storage apparatus 2B, and, as shown in FIG. 3, are configured from a "logical unit number" column 23A, an "update bitmap setting" column 23B, an "update bitmap status" column 23C, a "threshold area top position" column 23D, and a "threshold area end position" column 23E.

Among the above, the "logical unit number" column 23A stores the identification number (volume number) of each logical volume VOL registered in the update bitmap management tables 21A, 21B. In the case of this embodiment, since all logical volumes VOL formed in the primary storage apparatus 2A and the secondary storage apparatus 2B are registered in the update bitmap management tables 21A, 21B, in effect, the identification number of all logical volumes VOL formed in the primary storage apparatus 2A and the secondary storage apparatus 2B will be stored in the "logical unit number" column 23A.

The "update bitmap status" column 23B stores information ("YES" or "NO") regarding whether the update bitmaps 22A, 22B are set in the corresponding logical volume VOL. The "update bitmap status" column 23C stores information regarding whether the update bitmaps 22A, 22B of the logical volume VOL are set as "valid" or "invalid." When the update bitmaps 22A, 22B are set as "valid," the corresponding bit of the update bitmaps 22A, 22B is turned on when data is written in the corresponding logical volume VOL. When the update bitmaps 22A, 22B are set as "invalid," the corresponding bit of the update bitmap 22A, 22B is not turned on even when data is written in the logical volume VOL.

Further, the "threshold area top position" column 23D and the "threshold area end position" column 23E respectively store the top address and end address of the area (this is hereinafter referred to as the "threshold area") that is set for determining whether the volume of written data in relation to the volume size of the corresponding logical volume VOL has exceeded a given ratio. In the case of this embodiment, giving consideration to the fact that a logical volume VOL is usually used from an area with a small address, an area of a given capacity (for instance, 100 cylinders (1500 tracks) worth) from the area in Which the address of the logical volume VOL is largest (end area of the logical volume VOL) is automatically allocated as the threshold area. Then, simultaneously with the entry of a new logical volume VOL being registered in the update bitmap management tables 21A, 21B, the top address and end address of the threshold area are stored in the "threshold area top position" column 23D and the "threshold area end position" column 23E.

(2-3) Creation of New Logical Volume

Figure 4A:
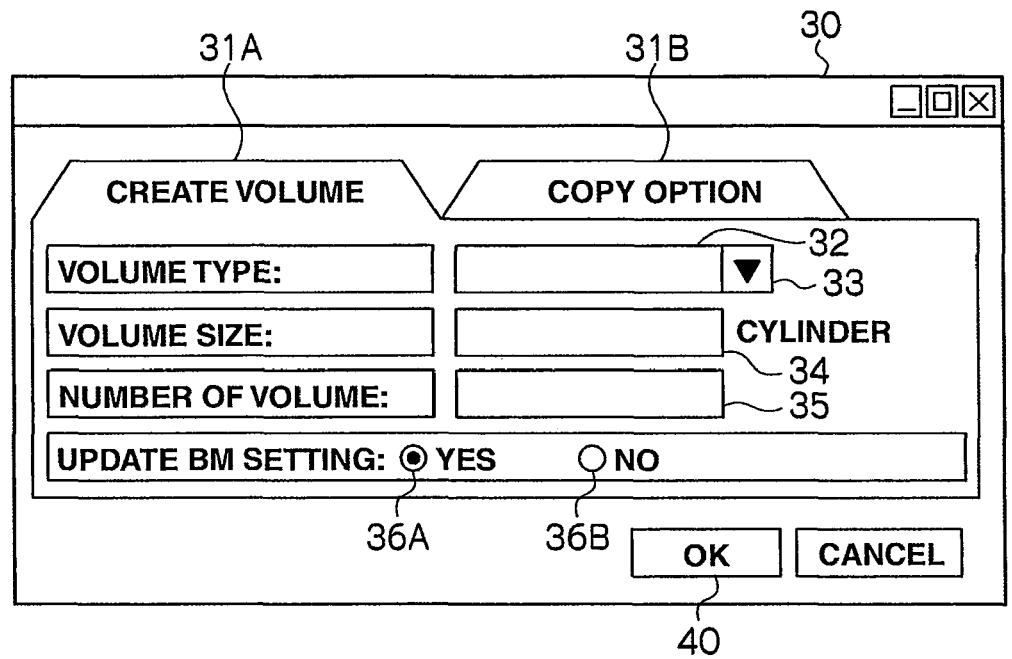
FIG. 4A and FIG. 4B are schematic diagrams showing a volume creation screen.
Figure 4B:
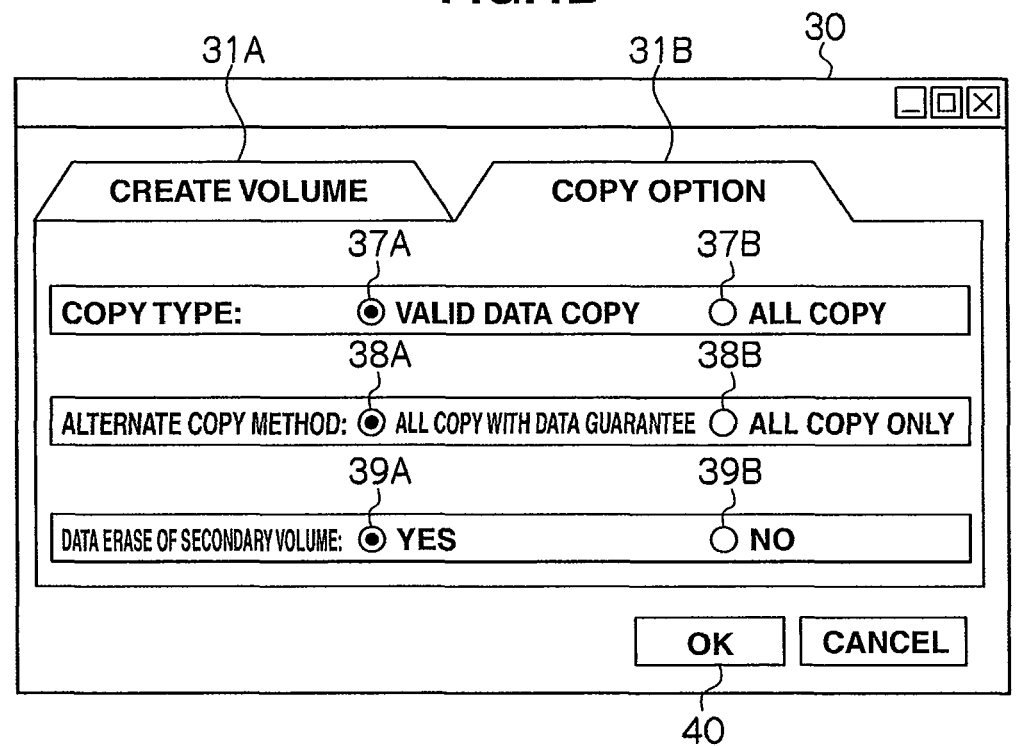

FIG. 4A and FIG. 4B show the volume creation screen 30 that can be displayed on a management terminal (not shown) of the primary storage apparatus 2A and the secondary storage apparatus 2B according to prescribed operations in the storage system 1. The volume creation screen 30 is a GUI (Graphical User Interface) screen for creating a new logical volume VOL in the primary storage apparatus 2A and the secondary storage apparatus 2B, and comprises a volume creation tag 31A and a copy option tag 31B.

In the volume creation tag 31A, the user is able to make various settings regarding the configuration of the logical volume VOL to be newly created, and in the copy option tag 31B, the user is able to set various options concerning the initial copy of remote copy with the logical volume VOL being the primary volume PVOL.

Practically, in the volume creation tag 31A, by clicking a pulldown menu button 33 displayed on the right side of the volume type designation column 32, a pulldown menu (not shown) listing the selectable volume types can be displayed, and, by selecting a desired volume type among the volume types displayed on the pulldown menu, the volume type of the logical volume VOL to be newly created can be designated. The designated volume type will be displayed on the volume type designation column 32.

Further, in the volume creation tag 31A, a desired volume size as the volume size of the logical volume VOL to be newly created can be designated by directly inputting such volume size in cylinder units into the volume size designation column 34, and the number of volumes to be created can be designated by directly inputting such number of volumes into the number of volumes designation column 35.

Further, in the volume creation tag 31A, whether to set the update bitmaps 22A, 22B regarding the logical volume VOL to be newly created can be designated by clicking one of the radio buttons 36A, 36B respectively provided in correspondence to the option of setting ("YES") or the option of no setting ("NO"). Nevertheless, when a volume size that is smaller than a predetermined size (this is hereinafter referred to as the "volume threshold size") is designated as the volume size of the logical volume VOL to be newly created, the radio button 36B corresponding to the option of setting the update bitmaps 22A, 22B will be inactively displayed, and only the option of not setting the update bitmap 22A, 22B can be selected.

Meanwhile, in the copy option tag 31B, either valid data copy or conventional copy can be designated as the copy type (copy method) of initial copy in the remote copy where the logical volume VOL to be newly created will be the primary volume by clicking one of the radio buttons 37A, 37B respectively provided in correspondence to the foregoing copy types.

Further, in the copy option tag 31B, either data guarantee copy of verifying whether copy was performed properly after the initial copy or conventional copy that does not conduct such verification can be designated as an alternate initial copy method when it is not possible to actually perform valid data copy (for instance, when the update bitmaps 22A, 22 are not set regarding the logical volume VOL to be newly created or the update bitmaps 22A, 22B are invalidated) even though valid data copy was selected as the initial copy method of remote copy by clicking one of the radio buttons 38A, 38B respectively provided in correspondence to the foregoing copy types.

Moreover, in the copy option tag 31B, whether to execute the foregoing erase processing after the completion of initial copy can be designated by clicking one of the radio button 39A, 39B respectively provided in correspondence to the option of execution ("YES") and the option of no execution ("NO").

After designating the desired conditions and the like regarding the logical volume VOL to be newly created in the volume creation tag 31A and the copy option tag 31B, the user clicks the OK button 40 displayed at the lower right part of the volume creation screen 30. Thereby, the contents designated by the user for the various items on the volume creation screen 30 are incorporated into the management terminal as volume creation information, and given to the configuration controllers 17A, 17B of the primary storage apparatus 2A and the secondary storage apparatus 2B.

The configuration controllers 17A, 17B that received the volume creation information create a logical volume VOL according to the various designated contents contained in the volume creation information, and register the necessary information concerning the logical volume VOL in the update bitmap management tables 21A, 21B. Further, the configuration controllers 17A, 17B also store information, among the various types of information contained in the volume creation information, which is not registered in the update bitmap management tables 21A, 21B in the shared memories 16A, 15B.

Moreover, when it is designated in the volume creation information that the update bitmaps 22A, 22B should be set, the configuration controllers 17A, 17B set the update bitmaps 22A, 22B of the created logical volume VOL in such logical volume VOL. Incidentally, the specific processing contents of the configuration controllers 17A, 17B concerning the creation of a new logical volume VOL will be described later.

(2-4) Data Write Reflection Processing

Figure 5:
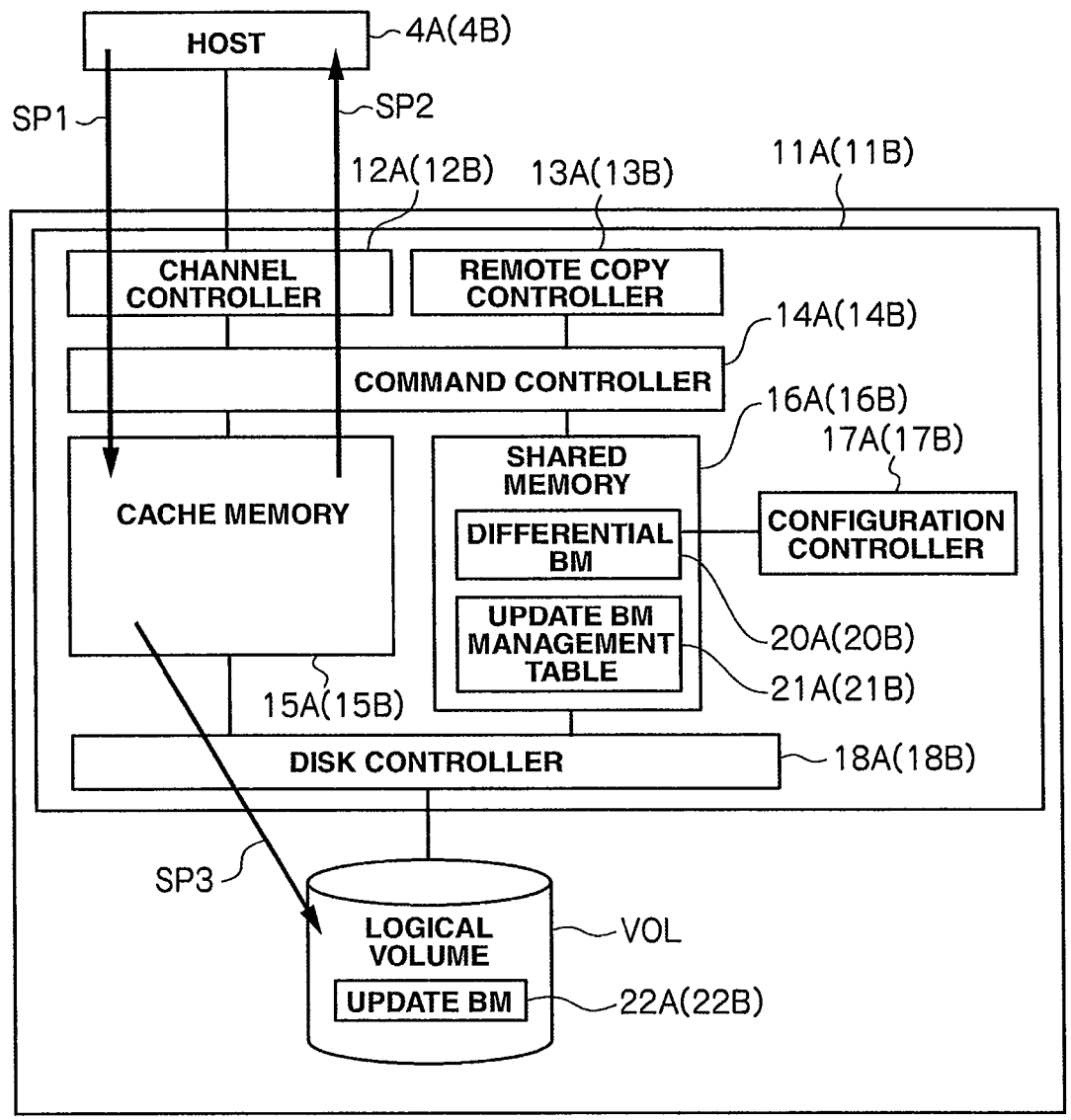
FIG. 5 is a block diagram explaining data write reflection processing.

When a write command and write-target data to be written in the created logical volume VOL are provided from the hosts 4A, 4B, as shown in FIG. 5, the primary storage apparatus 2A and the secondary storage apparatus 2B store such write command and write-target data in the cache memories 15A, 15B (SP1) and, at the stage when the storage of such write command and write-target data in the cache memories 15A, 15B is complete, send a completion notice indicating that the writing of data is complete to the hosts 4A, 4B (SP2).

The primary storage apparatus 2A and the secondary storage apparatus 2B thereafter write the data stored in the cache memories 15A, 15B into a corresponding area of the logical volume VOL designated in the write command. Nevertheless, when the update bitmaps 22A, 22B are set in the logical volume VOL and such update bitmaps 22A, 22B are valid, the primary storage apparatus 2A and the secondary storage apparatus 2B reflect the writing of data in the update bitmaps 22A, 22B simultaneously with such writing of data (SP3).

Figure 6:
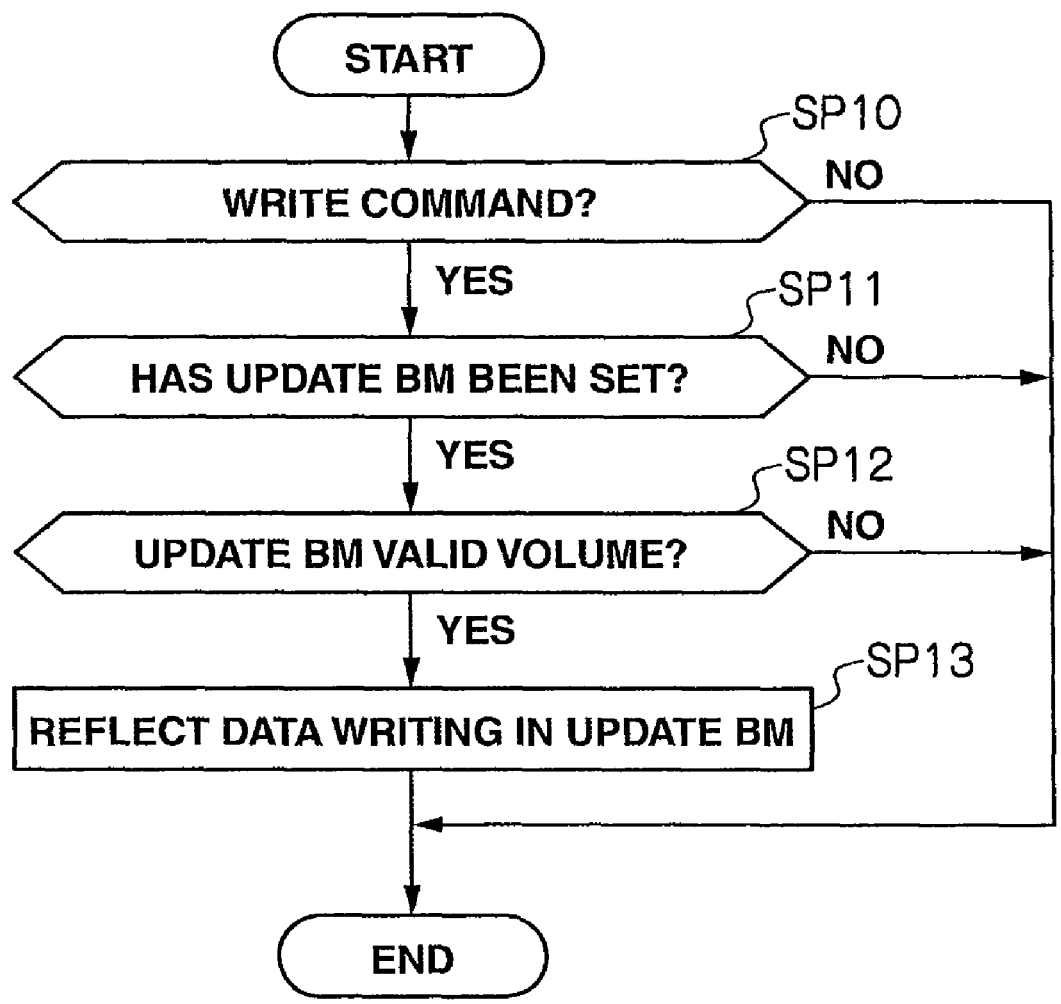
FIG. 6 is a flowchart showing the processing contents of data write reflection processing.

FIG. 6 shows the specific processing contents of the disk controllers 18A, 18B in the primary storage apparatus 2A and the secondary storage apparatus 2B concerning the data write reflection processing for reflecting the writing of data in the primary volume PVOL in the update bitmaps 22A, 22B.

The disk controllers 18A, 18B are periodically referring to the cache memories 15A, 15B, and, when they discover that a command from the hosts 4A, 4B has been stored in the cache memories 15A, 15B, the disk controllers 18A, 18B determine whether that command is a write command (SP10).

When the disk controllers 18A, 18B obtain a negative result in this determination, they end this processing. Contrarily, when the disk controllers 18A, 18B obtain a positive result, they sequentially determine whether the update bitmap 22A, 22B are set in the logical volume VOL to be written with data designated in the write command, and, if the update bitmaps 22A, 22B are set, determine whether "valid" is set in the update bitmaps 22A, 22B (SP11, SP12).

When the disk controllers 18A, 18B obtain a negative result in the determination at either step SP11 or step SP12, they end this processing. Contrarily, when the disk controllers 18A, 18B obtain a positive result at both step SP11 and step SP12, they reflect the writing of data in the update bitmaps 22A, 22B set in the logical volume VOL (SP13). The disk controllers 18A, 18B thereafter end this data write reflection processing.

(2-5) Management of Update Bitmap

The initial copy based on the foregoing valid data copy is performed by referring to the update bitmaps 22A, 22B when the logical volume VOL in which the update bitmaps 22A, 22B are "valid" is to become the primary volume PVOL.

In the foregoing case, for instance, when performing initial copy with a logical volume VOL originally having a small volume size or a logical volume in which a majority of the logical blocks have been updated (data was written from the hosts 4A, 4B) being the primary volume PVOL, there will not be much difference in the time required to perform full copy of copying all data in the primary volume PVOL to the secondary volume SVOL, and the time required to perform valid data copy.

Thus, in the present embodiment, when the volume size of the logical volume VOL at the time such logical volume VOL was created is smaller than the volume threshold size described with reference to FIG. 4 (first non-reflection condition), or when the unupdated area to which valid data in the logical volume VOL was not written becomes smaller than the threshold area size described with reference to FIG. 3 (second non-reflection condition), the writing of data from the hosts 4A, 4B into the logical volume VOL is not reflected in the update bitmaps 22A, 22B.

Incidentally, the trigger for ceasing to reflect the writing of data in the update bitmaps 22A, 22B will be at the time the logical volume VOL is created in a case where the volume size of the logical volume VOL is smaller than the volume threshold size, and at the time when the unupdated area in the logical volume VOL becomes smaller than the threshold area size in such a case.

Figure 7:
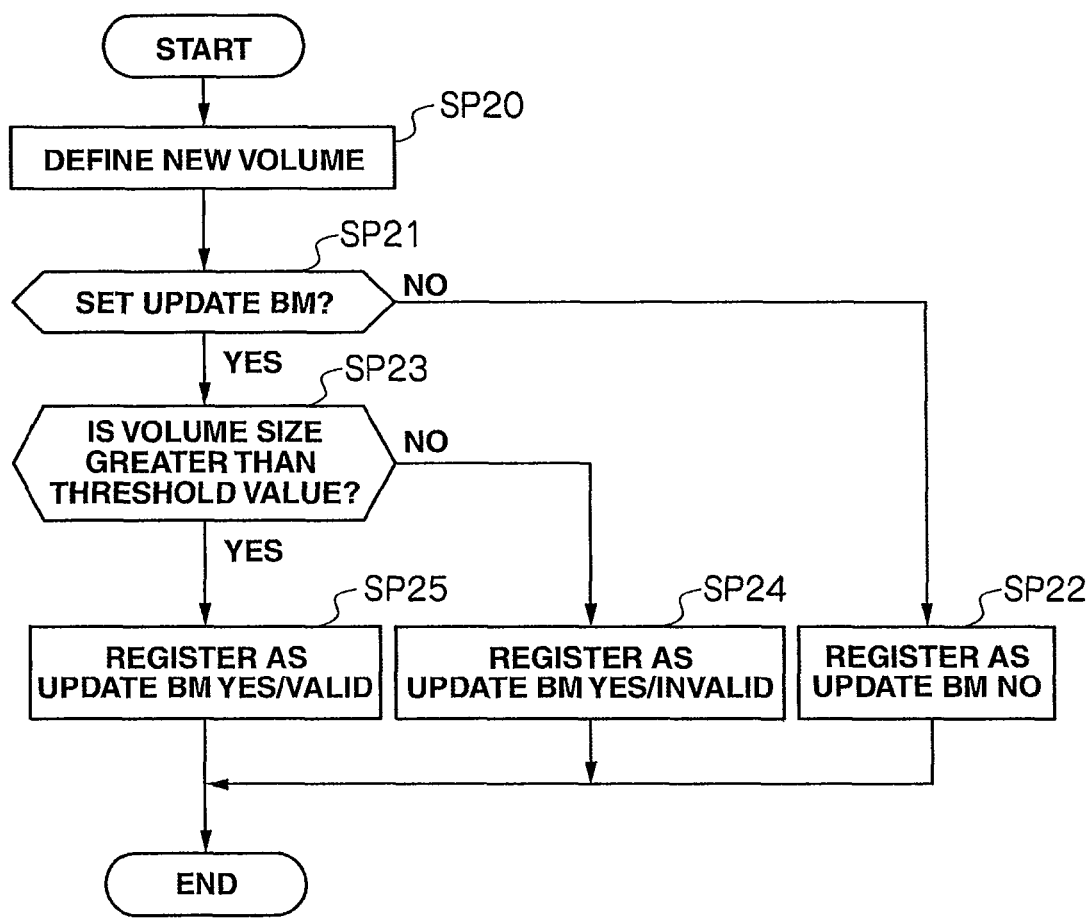
FIG. 7 is a flowchart showing the processing contents of a configuration controller concerning the first non-reflection condition.

The specific processing contents concerning the former (first non-reflection condition) are now explained. This processing is performed by the configuration controllers 17A, 17B of the primary storage apparatus 2A and the secondary storage apparatus 2B according to the processing routine shown in FIG. 7.

In other words, when the configuration controllers 17A, 17B receive the foregoing volume creation information from a management terminal not shown, they foremost define the logical volume VOL according to the volume type and volume size designated by the user in a quantity designated by the user (SP20). Further, the configuration controllers 17A, 17B thereafter determine whether the update bitmaps 22A, 22B are set in the created logical volume VOL based on the volume creation information (SP21).

When the configuration controllers 17A, 17B obtain a negative result in this determination, they register the entry regarding the logical volume VOL defined at step SP20 in the update bitmap management tables 21A, 21B (FIG. 3) indicating that the update bitmaps 22A, 22B are not set (SP22). Accordingly, since the update bitmaps 22A, 22B are not set in this logical volume VOL, valid data copy cannot be used as the initial copy method of remote copy.

Contrarily, when the configuration controllers 17A, 17B obtain a positive result in the determination at step SP21, they determine whether the volume size of the logical volume VOL defined at step SP20 is greater than the volume threshold size (SP23).

When the configuration controllers 17A, 17B obtain a negative result in this determination, they register the entry regarding the logical volume VOL defined at step SP20 in the update bitmap management tables 21A, 21B indicating that the update bitmaps 22A, 22B are set (setting of the update bitmaps 22A, 22B is "YES"), but the update bitmaps 22A, 22B are invalid (status of the update bitmaps 22A, 22B is "invalid") (SP24). Therefore, even when data is written from the hosts 4A, 4B in this logical volume VOL, since such writing of data is not reflected in the update bitmaps 22A, 22B, valid data copy cannot be used as the initial copy method of remote copy.

When the configuration controllers 17A, 17B obtain a positive result in the determination at step SP23, they register the entry regarding the logical volume VOL defined at step SP20 in the update bitmap management tables 21A, 21B indicating that the update bitmaps 22A, 22B are set (setting of the update bitmaps 22A, 22B is "YES"), and the update bitmaps 22A, 22B are valid (status of the update bitmaps 22A, 22B is "valid") (SP25). Therefore, with this logical volume VOL, when data is written from the hosts 4A, 4B in this logical volume VOL, since such writing of data is reflected in the update bitmaps 22A, 22B, valid data copy can be used as the initial copy method of remote copy based on the update bitmaps 22A, 22B.

The specific processing contents concerning the latter (second non-reflection condition) are now explained. As described above, the disk controllers 18A, 18B of the primary storage apparatus 2A and the secondary storage apparatus 2B are periodically referring to the cache memories 15A, 15B. When the disk controllers 18A, 18B discover that a write command is stored in the cache memories 15A, 15B, they store the write-target data stored in the cache memories 15A, 15B in an area designated in the logical volume (this is hereinafter referred to as the "designated logical volume") VOL designated in the write command. Concurrently with this, the disk controllers 18A, 18B execute the write data volume determination processing illustrated in FIG. 8.

In other words, when the disk controllers 18A, 18B detect that a write command is stored in the cache memories 15A, 15B, they refer to the corresponding "threshold area top position" column 23D (FIG. 3) and "threshold area end position" column 23E (FIG. 3) in the update bitmap management tables 21A, 21B, and determine whether the threshold area in the designated logical volume VOL is contained in the write destination of the write-target data designated in the write command (SP30). When the disk controllers 18A, 18B obtain a negative result in this determination, they end this write data volume determination processing.

Contrarily, when the disk controllers 18A, 18B obtain a positive result in the determination at step SP30, they read the update bitmaps 22A, 22B of the designated logical volume VOL from the designated logical volume VOL into the cache memories 15A, 15B (SP31), and determine whether the number of bits that are turned off in the update bitmaps 22A, 22B is less than the number of bits associated with any one of the areas in the threshold area (SP32).

When the disk controllers 18A, 18B obtain a negative result in this determination, they change the location of the threshold area in the designated logical volume VOL. Specifically, the disk controllers 18A, 18B conduct a search from the terminal of the designated logical volume VOL. When there are areas that are consecutively unupdated in a size that is the same as the threshold area, the disk controllers 18A, 18B register such areas as the new threshold area in the update bitmap management tables 21A, 21B. Further, when there are no areas that are consecutively unupdated in a size that is the same as the threshold area, the disk controllers 18A, 18B register the unupdated area of the maximum size among the consecutive unupdated areas in the designated logical volume VOL as the new threshold area in the update bitmap management tables 21A, 21B (SP33).

Contrarily, when the disk controllers 18A, 18B obtain a positive result in the determination at step SP32, they change the setting of the entry of the designated logical volume VOL in the update bitmap management tables 21A, 21B to "YES" for the setting of the update bitmaps 22A, 22B, and to "invalid" for the status of the update bitmaps 22A, 22B. Thereby, even when data from the hosts 4A, 4B is thereafter written in the designated logical volume VOL, such writing of data will not be reflected in the update bitmaps 22A, 22B (refer to step SP12 of FIG. 6).

(2-6) Initial Copy Processing
(2-6-1) Initial Copy Method

As described above, the storage system 1 has valid data copy and conventional copy as the initial copy method of remote copy.

Here, for valid data copy, upon referring to the differential bitmap 20A copied with the update bitmap 22A in the primary volume PVOL, only valid data (data written from the host 4A) among the data in the primary volume PVOL is copied to the secondary volume SVOL.

Therefore, even when valid data copy is designated as the initial copy method of remote copy regarding a certain primary volume PVOL, valid data copy cannot be performed when the update bitmap 22A of that primary volume PVOL is not set or the update bitmap 22A is invalid.

In the foregoing case, initial copy based on the copy method (data guarantee copy or conventional copy) designated as the alternate copy method in the copy option tag 31B of the volume creation screen 30 described with reference to FIG. 4 will be performed.

Figures 8, 9:
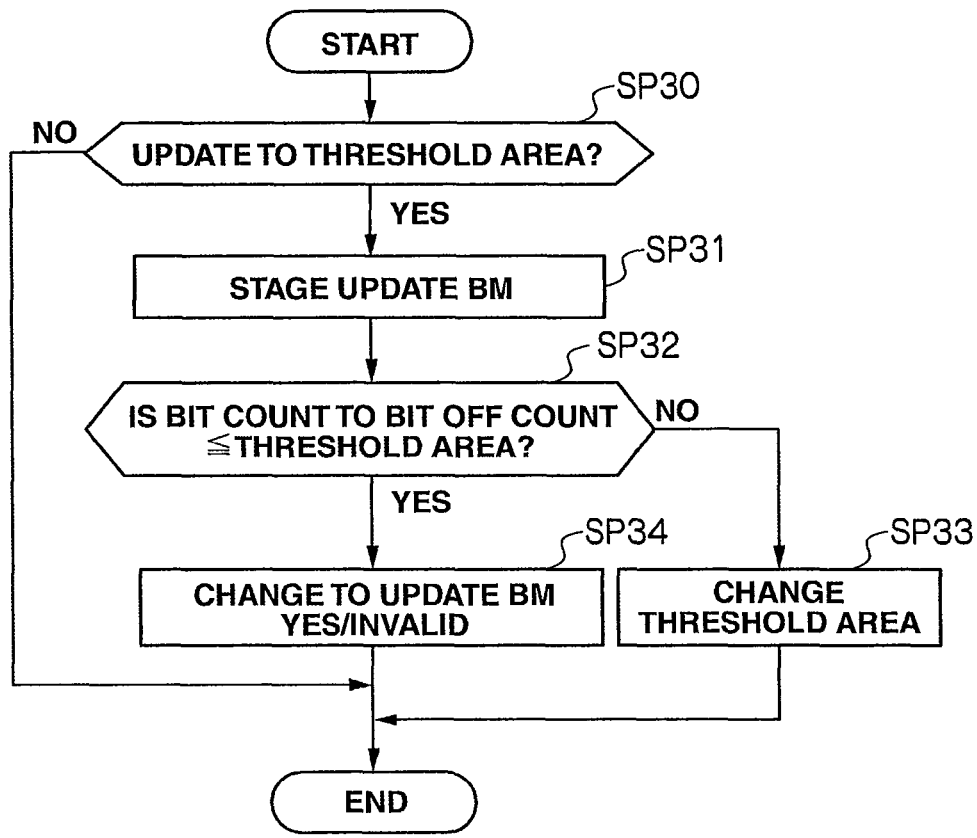
FIG. 8 is a flowchart showing the processing contents of a disk controller concerning the second non-reflection condition.
FIG. 9 is a chart explaining the initial copy method.

FIG. 9 is a diagram showing the comparison of the copy range and the status of data guarantee processing when adopting valid data copy, data guarantee copy or conventional copy as the initial copy method.

As evident from FIG. 9, with valid data copy, only valid data is copied as the copy range, and whether copy was properly performed is verified after the initial copy is complete (data guarantee processing). Further, with data guarantee copy, all areas of the primary volume PVOL are copied as the copy range, and data guarantee processing is performed after the copy is complete. Moreover, with conventional copy, all areas of the primary volume PVOL are copied as the copy range, and data guarantee processing is not performed after the copy is complete.

Incidentally, FIG. 10 shows which copy method will be used for the initial copy according to the respective settings of the copy type and alternate copy method, and the status (valid/invalid) of the update bitmap 22A at such time. As evident from FIG. 10, when valid data copy is set as the copy type and the update bitmap 22A is set regarding the primary volume PVOL, regardless of whether the data guarantee copy or the conventional copy is set as the alternate copy method, valid data copy will be performed if the update bitmap 22A is valid, and data guarantee copy will be performed if the update bitmap 22A is invalid.

Further, when valid data copy is set as the copy type and the update bitmap 22A is not set regarding the primary volume PVOL, data guarantee copy is performed when data guarantee copy is set as the alternate copy method, and conventional copy is performed when conventional copy is set as the alternate copy method. Moreover, when conventional copy is set as the copy type regarding the primary volume PVOL, conventional copy is performed as per normal.

The selection and decision of the copy method of initial copy, as described above, is conducted by the remote copy controller 13A based on configuration information regarding the primary volume PVOL input by the user with a management terminal (not shown) in the primary storage apparatus 2A upon creating the primary volume PVOL.

(2-6-2) Initial Copy Prestart Processing

Figure 11:
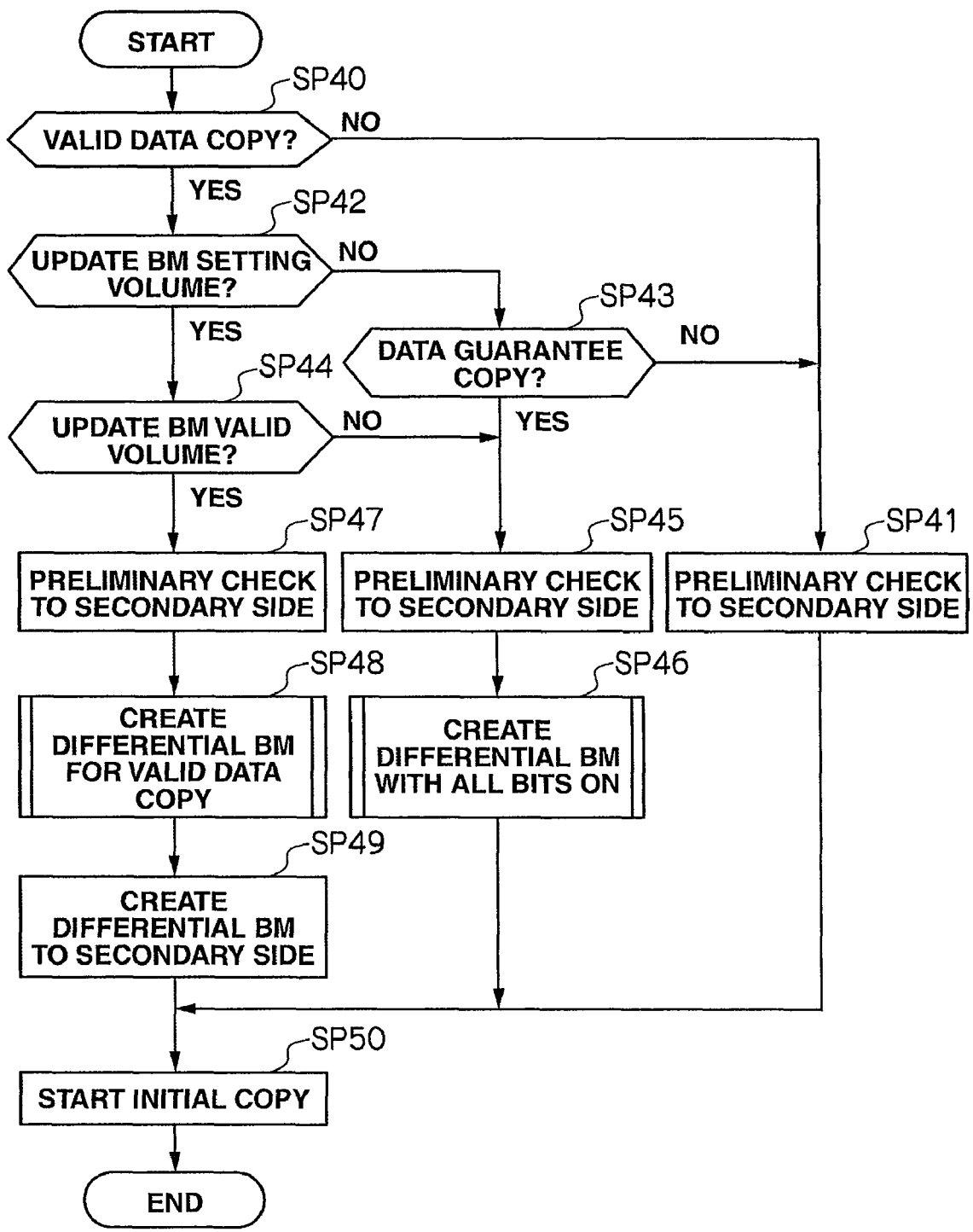
FIG. 11 is a flowchart showing the processing contents of first initial copy prestart processing.

FIG. 11 shows the processing contents of the remote copy controller of the primary storage apparatus 2A (this is hereinafter referred to as the "primary-side remote copy controller") 13A (FIG. 1) prior to starting the initial copy. When the primary-side remote copy controller 13A receives a copy pair formation command designating the primary volume PVOL and the secondary volume SVOL sent from the host 4A according to the user's operation via the channel controller 12A (FIG. 1), it starts the first initial copy prestart processing illustrated in FIG. 11, and foremost determines whether the copy type of initial copy set regarding the primary volume PVOL designated in the copy pair formation command is valid data copy (SP40).

When the primary-side remote copy controller 13A obtains a negative result in this determination, it communicates with the remote copy controller of the secondary storage apparatus 2B (this is hereinafter referred to as the "secondary-side remote copy controller") 13B (FIG. 1), and conducts a preliminary check on whether it is possible to form a copy pair with the primary volume PVOL and the secondary volume SVOL designated in the copy pair formation command. Further, in addition to this, the primary-side remote copy controller 13A notifies the copy method of initial copy (conventional copy in this case) to be executed subsequently to the secondary-side remote copy controller 13B. When the primary-side remote copy controller 13A receives a notice to the effect that a copy pair can be formed from the secondary-side remote copy controller 13B (refer to step SP65 of FIG. 12), it sets the primary volume PVOL and the secondary volume SVOL as a copy pair (SP41). The primary-side remote copy controller 13A thereafter proceeds to step SP50.

Contrarily, when the primary-side remote copy controller 13A obtains a positive result in the determination at step SP40, it refers to the update bitmap management table 21A (FIG. 3) and determines whether the update bitmap 22A is set in the primary volume PVOL (SP42).

When the primary-side remote copy controller 13A obtains a negative result in this determination, it determines whether the alternate copy method designated in the volume creation information regarding the primary volume PVOL is data guarantee copy (SP43).

When the primary-side remote copy controller 13A obtains a negative result in this determination, it proceeds to step SP41. Contrarily, when the primary-side remote copy controller 13A obtains a positive result in this determination, it communicates with the secondary-side remote copy controller 13B, and conducts a preliminary check on whether a copy pair can be formed with the primary volume PVOL and the secondary volume SVOL designated in the copy pair formation command. Further, in addition to this, the primary-side remote copy controller 13A notifies the copy method of initial copy (data guarantee copy in this case) to be executed subsequently to the secondary-side remote copy controller 13B. When the primary-side remote copy controller 13A receives a notice to the effect that a copy pair can be formed from the secondary-side remote copy controller 13B (refer to step SP65 of FIG. 12), it sets the primary volume PVOL and the secondary volume SVOL as a copy pair (SP45).

The primary-side remote copy controller 13A thereafter creates a differential bitmap 20A (FIG. 1) with all bits turned on in the shared memory 16A (FIG. 1) (SP46), and then proceeds to step SP50.

Meanwhile, when the primary-side remote copy controller 13A obtains a positive result in the determination at step SP42, it refers to the update bitmap management table 21A and determines whether the update bitmap 22A of the primary volume PVOL is valid (SP44).

When the primary-side remote copy controller 13A obtains a negative result in this determination, it proceeds to step SP45. Contrarily, when the primary-side remote copy controller 13A obtains a positive result in this determination, it communicates with the secondary-side remote copy controller 13B, and conducts a preliminary check on whether a copy pair can be formed with the primary volume PVOL and the secondary volume SVOL designated in the copy pair formation command. Further, in addition to this, the primary-side remote copy controller 13A notifies the copy method of initial copy (valid data copy in this case) to be executed subsequently to the secondary-side remote copy controller 13B. When the primary-side remote copy controller 13A receives a notice to the effect that a copy pair can be formed from the secondary-side remote copy controller 13B (refer to step SP65 of FIG. 12), it sets the primary volume PVOL and the secondary volume SVOL as a copy pair (SP47).

Subsequently, the primary-side remote copy controller 13A creates a differential bitmap 20A for valid data copy reflecting the current update bitmap 22A in the shared memory 16A (SP48), and sends the created differential bitmap 20A to the secondary-side remote copy controller 13B (SP49).

The primary-side remote copy controller 13A thereafter starts the initial copy with the copy method notified to the secondary-side remote copy controller 13B at step SP41, step SP45 or step SP47 (SP50).

Figure 12:
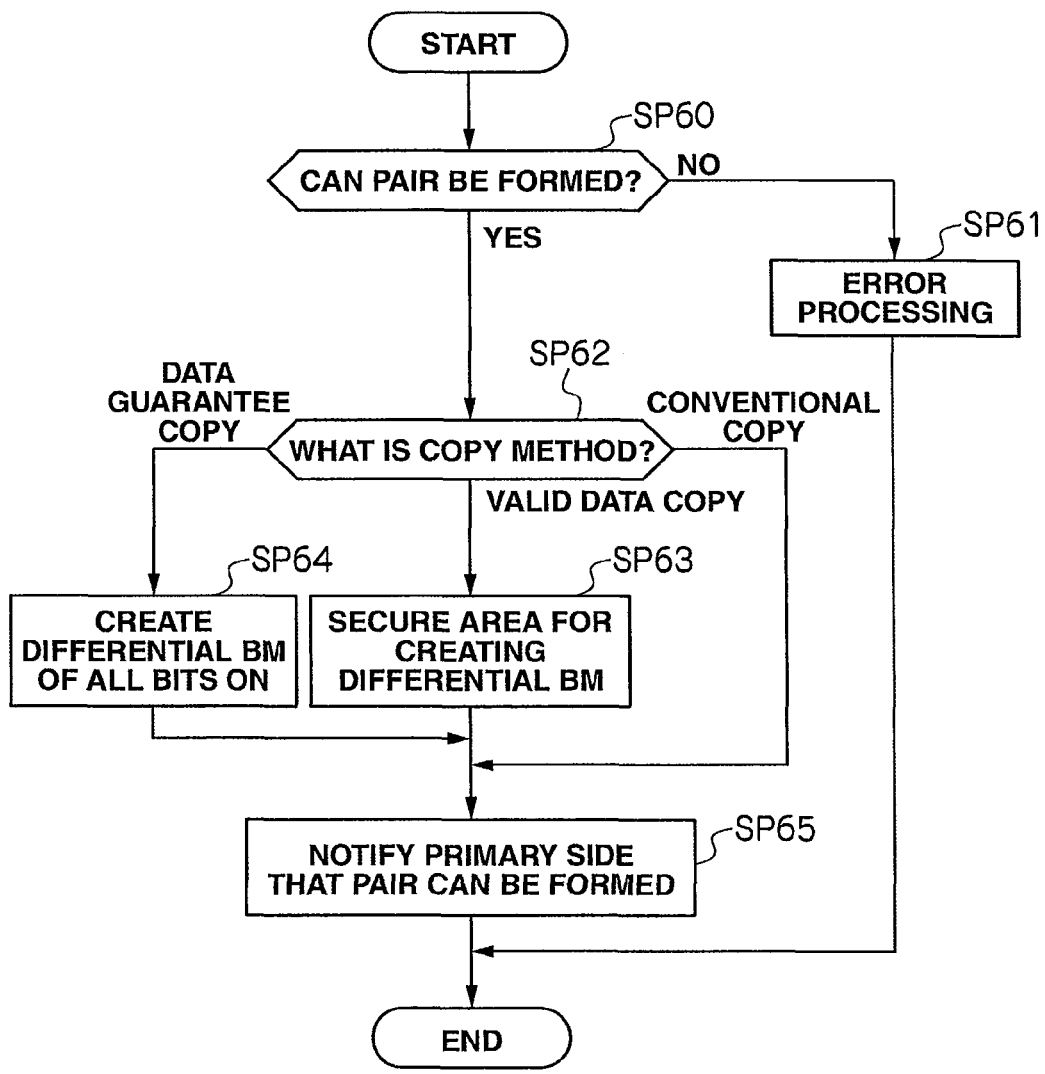
FIG. 12 is a flowchart showing the processing contents of second initial copy prestart processing.

Meanwhile, FIG. 12 shows the processing contents of the secondary-side remote copy controller 13B notified of the copy method of initial copy to be subsequently executed from the primary-side remote copy controller 13A at step SP41, step SP45 or step SP47 of the first initial copy prestart processing.

When the secondary-side remote copy controller 13B is notified of the copy method, it starts the second initial copy prestart processing illustrated in FIG. 12, and foremost determines whether a copy pair can be formed with the logical volume VOL to become the primary volume PVOL and the logical volume VOL to become the secondary volume SVOL notified by the primary-side remote copy controller 13A during the preliminary check at step SP41, step SP45 or step SP47 of the first initial copy prestart processing described with reference to FIG. 11 (SP60).

In the foregoing case, for example, if the volume size of the logical volume VOL to become the secondary volume SVOL is smaller than the volume size of the logical volume VOL to become the primary volume PVOL, a copy pair cannot be formed with these logical volumes VOL. Thereby, the secondary-side remote copy controller 13B executes prescribed error processing such as sending an error message to such effect to the primary-side remote copy controller 13A (SP61).

Contrarily, when the secondary-side remote copy controller 13B obtains a positive result in the determination at step SP60, it determines whether the copy method notified from the primary-side remote copy controller 13A at step SP41, step SP45 or step SP47 of the first initial copy prestart processing described with reference to FIG. 11 is data guarantee copy, valid data copy or conventional copy (SP62).

When the copy method is valid data copy, the secondary-side remote copy controller 13B secures an area for creating the differential bitmap 20A in the shared memory 16B (SP63), and thereafter proceeds to step SP65. Accordingly, when the secondary-side remote copy controller 13B receives the differential bitmap 20A sent from the primary-side remote copy controller 13A (refer to step SP49 of FIG. 11), it creates the secondary storage apparatus 2B-side differential bitmap 20B by copying the differential bitmap 20A to the foregoing area.

Further, when the copy method is data guarantee copy, the secondary-side remote copy controller 13B creates a differential bitmap 20B with all bits turned on (SP64), thereafter notifies the primary-side remote copy controller 13A that a pair can be formed (SP65), and then ends this second initial copy prestart processing.

Figure 13:
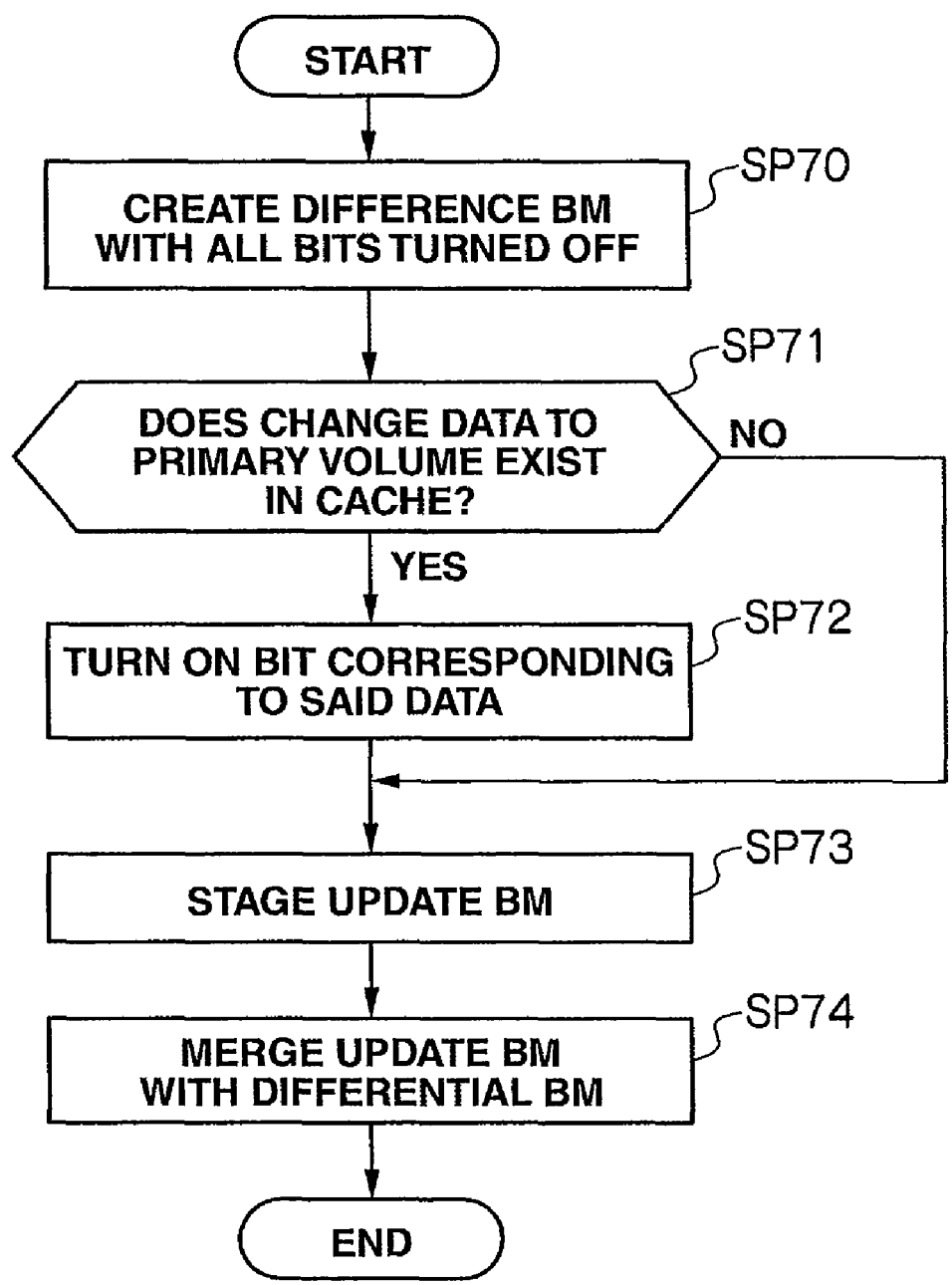
FIG. 13 is a flowchart showing the processing contents of differential bitmap creation processing.

Here, FIG. 13 shows the specific processing contents of the primary-side remote copy controller 13A at step SP48 of the first initial copy prestart processing described with reference to FIG. 11.

When the primary-side remote copy controller 13A proceeds to step SP48, it starts the differential bitmap creation processing illustrated in FIG. 13, and foremost creates a differential bitmap 20A with all bits turned off in the shared memory 16A (SP70). Subsequently, the primary-side remote copy controller 13A determines whether write-target data which has not yet been written in the primary volume PVOL exists in the cache memory 15A (SP71).

When the primary-side remote copy controller 13A obtains a negative result in this determination, it proceeds to step SP73. Contrarily, when the primary-side remote copy controller 13A obtains a positive result in this determination, it turns on the bit in the differential bitmap 20A corresponding to the area in the primary volume PVOL to which the write-target data is to be written (SP72).

Subsequently, the primary-side remote copy controller 13A reads the update bitmap 22A of the primary volume PVOL from the primary volume PVOL into the cache memory 15A via the disk controller 18A (FIG. 1) (SP73).

The primary-side remote copy controller 13A thereafter merges the update bitmap 22A with the differential bitmap 20A created at step SP70 (SP74), and then ends this differential bitmap creation processing.

Incidentally, when the primary-side remote copy controller 13A creates a differential bitmap 20A, since the subsequent writing of data from the host 4A in the primary volume PVOL will be reflected in the differential bitmap 20A, the writing of data from the host 4A will never be unreflected in the differential bitmap 20A.

(2-6-3) Initial Copy Processing

Initial copy is performed by the primary-side remote copy controller 13A coordinating with the secondary-side remote copy controller 13B.

Specifically, when performing the initial copy based on valid data copy, the primary-side remote copy controller 13A foremost sequentially reads data from the respective areas where all bits are on in the differential bitmap 20A of the primary volume PVOL via the disk controller 18A (FIG. 1) while referring to the differential bitmap 20A created in the shared memory 16A. Subsequently, the primary-side remote copy controller 13A sends the read data to the secondary-side remote copy controller 13B, and additionally turns off the corresponding bits in the differential bitmap 20A.

Further, the secondary-side remote copy controller 13B sequentially writes the data sent from the primary-side remote copy controller 13A in the corresponding area of the secondary volume SVOL via the disk controller 18B (FIG. 1). Subsequently, the secondary-side remote copy controller 13B additionally turns off the corresponding bit of the differential bitmap 20B created in the shared memory 16B.

Thus, with the initial copy based on valid data copy, each time valid data stored in the primary volume PVOL is copied to the secondary volume SVOL, the corresponding bits in the primary storage apparatus 2A-side differential bitmap 20A and the corresponding bits in the secondary storage apparatus 2B-side differential bitmap 20B are turned off.

The primary-side remote copy controller 13A and the secondary-side remote copy controller 13B repeat the foregoing processing until all bits in the primary storage apparatus 2A-side differential bitmap 20A are turned off, and then end the initial copy when all bits in the differential bitmap 20A are eventually turned off.

The primary-side remote copy controller 13A and the secondary-side remote copy controller 13B perform initial copy according to the same procedures as in the case of valid data copy when performing the initial copy based on data guarantee copy. Nevertheless, in the foregoing case, since all bits of both the primary storage apparatus 2A-side differential bitmap 20A and the secondary storage apparatus 2B-side differential bitmap 20A are turned on, the difference with the valid data copy is in that all data stored in each area of the primary volume PVOL are copied to the secondary volume SVOL.

Meanwhile, in the initial copy based on conventional copy, the differential bitmaps 20A, 20B are neither created nor used on both the side of the primary storage apparatus 2A and the side of the secondary storage apparatus 2B. Here, the primary-side remote copy controller 13A sequentially reads the data stored in each area of the primary volume PVOL via the disk controller 18A, and sequentially sends such data to the secondary-side remote copy controller 13B. Further, the secondary-side remote copy controller 13B sequentially writes the data sent from the primary-side remote copy controller 13A in the corresponding area of the secondary volume SVOL via the disk controller 18B.

The primary-side remote copy controller 13A and the secondary-side remote copy controller 13B repeat the foregoing processing until all data stored in each area of the primary volume PVOL are all copied to the corresponding area in the secondary volume SVOL, and then ends the initial copy when the copy of all such data is complete.

(2-7) Initial Copy Post-Termination Processing (2-7-1) Initial Copy Data Guarantee Processing The data guarantee processing to be performed after the initial copy based on valid data copy or data guarantee copy is now explained.

Figure 14:
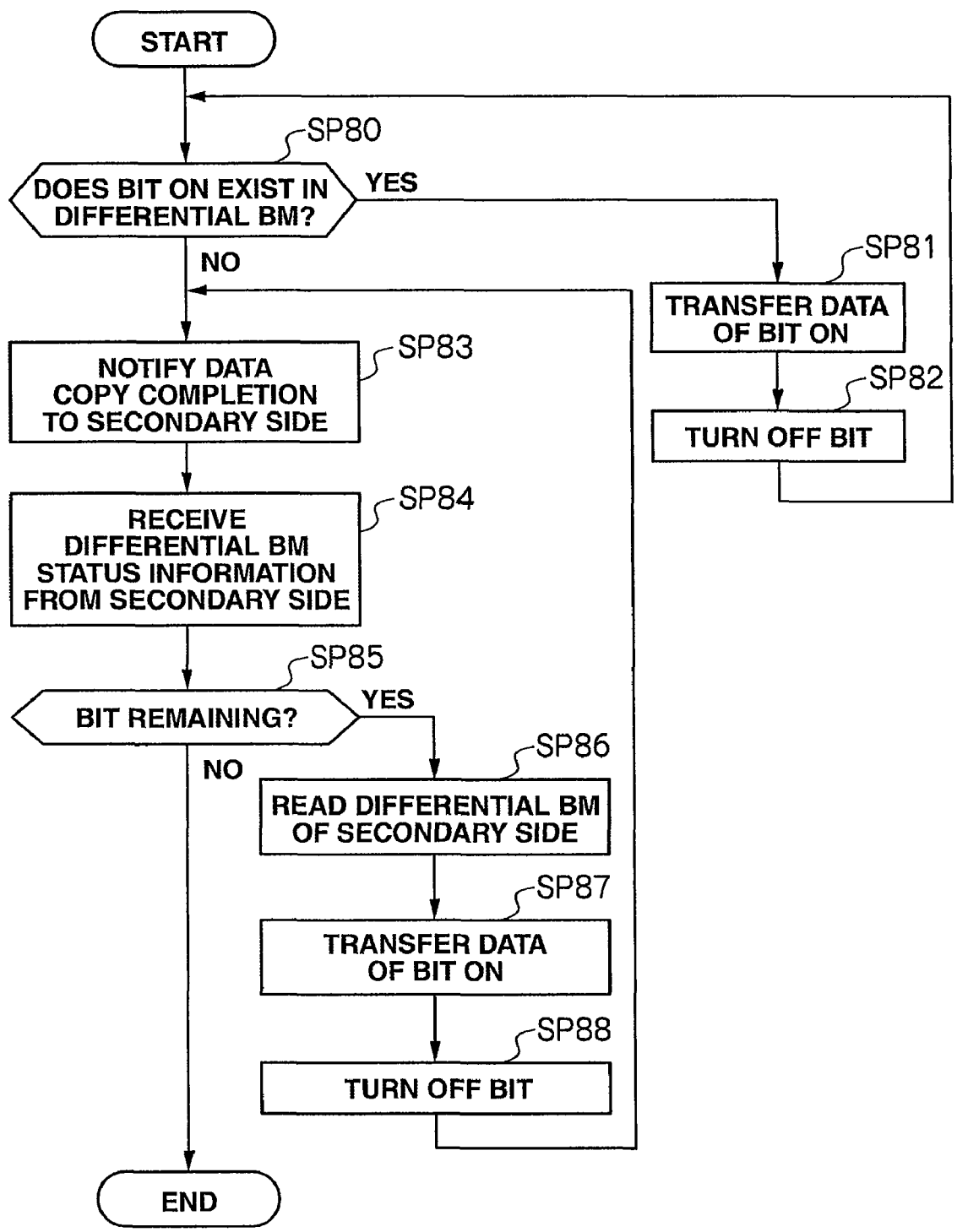
FIG. 14 is a flowchart showing the processing contents of first initial copy data guarantee processing.

FIG. 14 shows the specific processing contents of the data guarantee processing (this is hereinafter referred to as the "first initial copy data guarantee processing") to be performed by the primary-side remote copy controller 13A after the initial copy based on valid data copy or data guarantee copy.

When the initial copy is complete, the primary-side remote copy controller 13A starts the first initial copy data guarantee processing, and foremost determines whether a bit that has been turned on exists in the differential bitmap 20A used in the initial copy (SP80).

When the primary-side remote copy controller 13A obtains a negative result in this determination, it reads data from an area in the primary volume PVOL corresponding to the bit that is turned on, and transfers such data to the secondary-side remote copy controller 13B (SP81). The primary-side remote copy controller 13A thereafter turns off such bit in the differential bitmap 20A (SP82), and then repeats the foregoing processing until no bits that have been turned on exist in the differential bitmap 20A (SP80 to SP82-SP80).

When all bits in the differential bitmap 20A are eventually turned off, the primary-side remote copy controller 13A notifies the completion of data copy to the secondary-side remote copy controller 13B (SP83). Further, when the primary-side remote copy controller 13A consequently receives information (this is hereinafter referred to as the "secondary-side differential bitmap status information") concerning the current status of the secondary storage apparatus 2B-side differential bitmap 20B sent from the secondary-side remote copy controller 13B as described above (SP85), it determines whether a bit that has been turned on exists in the secondary storage apparatus 2B-side differential bitmap 20B based on this secondary-side differential bitmap status information (SP85).

Here, to obtain a positive result in this determination implies that the data in the primary volume PVOL which is considered to have been copied by the primary storage apparatus 2A-side differential bitmap 20A has not actually been copied to the secondary volume SVOL. Thereby, the primary-side remote copy controller 13A reads the secondary storage apparatus 2B-side differential bitmap 20B into the shared memory 16A of the self storage apparatus via the secondary-side remote copy controller 13B (SP86).

By thereafter controlling the disk controller 18A based on the secondary storage apparatus 2B-side differential bitmap 20B, the primary-side remote copy controller 13A reads data from all areas corresponding to the bits that are turned on in the differential bitmap 20B of the primary volume PVOL, and transfers such data to the secondary-side remote copy controller 13B (SP87).

The primary-side remote copy controller 13A turns off the corresponding bits in the secondary storage apparatus 2B-side differential bitmap 20B (SP88), thereafter returns to step SP83, and then repeats the foregoing processing (SP83 to SP88-SP83) until it obtains a positive result at step SP85 (in other words, until all bits of the secondary storage apparatus 2B-side differential bitmap 20B are turned off). The primary-side remote copy controller 13A ends this first initial copy data guarantee processing when all bits of the secondary storage apparatus 2B-side differential bitmap 20B are eventually turned off.

Figure 15:
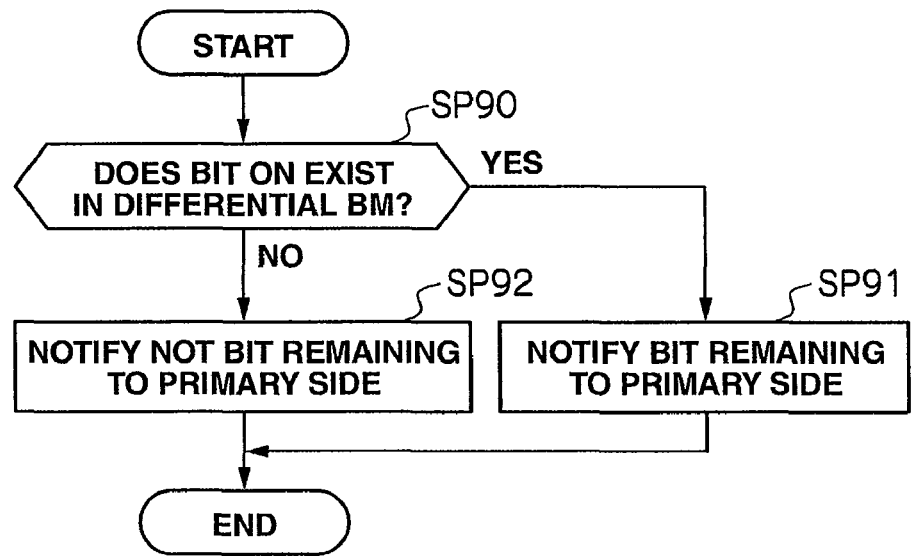
FIG. 15 is a flowchart showing the processing contents of second initial copy data guarantee processing.

Meanwhile, FIG. 15 shows the specific processing contents of the data guarantee processing (this is hereinafter referred to as the "second initial copy data guarantee processing") to be performed by the secondary-side remote copy controller 13B that received a data copy completion notice at step SP83 of the first initial copy data guarantee processing (FIG. 14).

When the secondary-side remote copy controller 13B receives the foregoing notice, it starts the second initial copy data guarantee processing, and foremost refers to the differential bitmap 20B stored in the shared memory 16B and determines whether a bit that has been turned on in the differential bitmap 20B exists (SP90).

When the secondary-side remote copy controller 13B obtains a positive result in this determination, it sends secondary-side differential bitmap status information indicating that a bit that has been turned on exists to the primary-side remote copy controller 13A (SP91). Contrarily, when the secondary-side remote copy controller 13B obtains a negative result in the determination at step SP90, it sends secondary-side differential bitmap status information indicating that a bit that has been turned on does not exist to the primary-side remote copy controller 13A (SP92). The secondary-side remote copy controller 13B thereafter ends this second initial copy data guarantee processing.

(2-7-2) Erase Processing

The erase processing to be performed by the primary-side remote copy controller 13A and the secondary-side remote copy controller 13B after the initial copy data guarantee processing is now explained.

Figure 16:
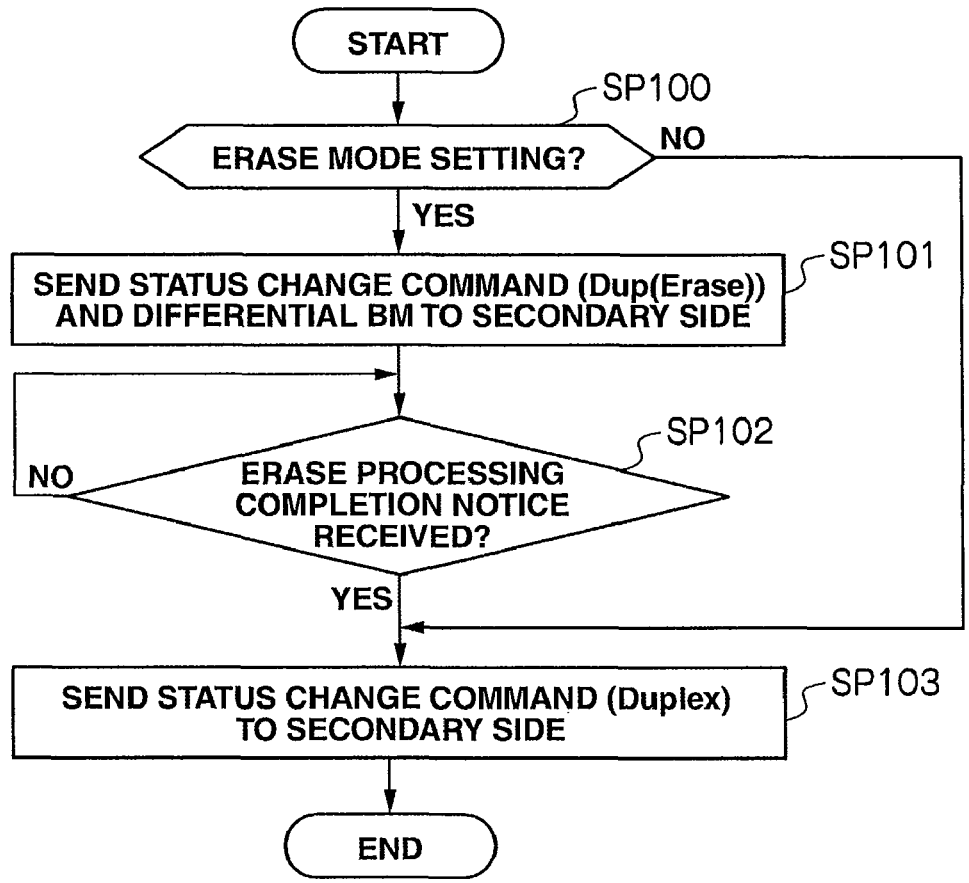
FIG. 16 is a flowchart showing the processing contents of first erase processing.

FIG. 16 shows the specific processing contents of the first erase processing to be executed by the primary-side remote copy controller 13A after the completion of the first initial copy data guarantee processing explained with reference to FIG. 14.

When the foregoing first initial copy data guarantee processing is complete, the primary-side remote copy controller 13A starts the first erase processing, and foremost determines whether an erase mode is set in the primary volume PVOL based on the volume creation information regarding the primary volume PVOL (SP100).

When the primary-side remote copy controller 13A obtains a negative result in this determination, it proceeds to step SP103. Contrarily, when the primary-side remote copy controller 13A obtains a positive result in this determination, it sends a status change (Dup(Erase)) command and a differential bitmap 20A representing the status of the current primary volume PVOL to the secondary-side remote copy controller 13B (SP101). Incidentally, this differential bitmap 20A is created according to the same processing as the processing explained with reference to FIG. 13.

Subsequently, the primary-side remote copy controller 13A awaits the erase processing completion notice described later, which is a response of the processing result to the status change (Dup(Erase)) command, to be sent from the secondary-side remote copy controller 13B (SP102).

When the primary-side remote copy controller 13A eventually receives the erase processing completion notice, it sends a status change (Duplex) command to the secondary-side remote copy controller 13B for changing the pair status of the copy pair formed from the primary volume PVOL and the secondary volume SVOL to a Duplex status (status where the data contents of the primary volume PVOL and the secondary volume SVOL are the same) (SP103), and then ends this first erase processing.

Figure 17:
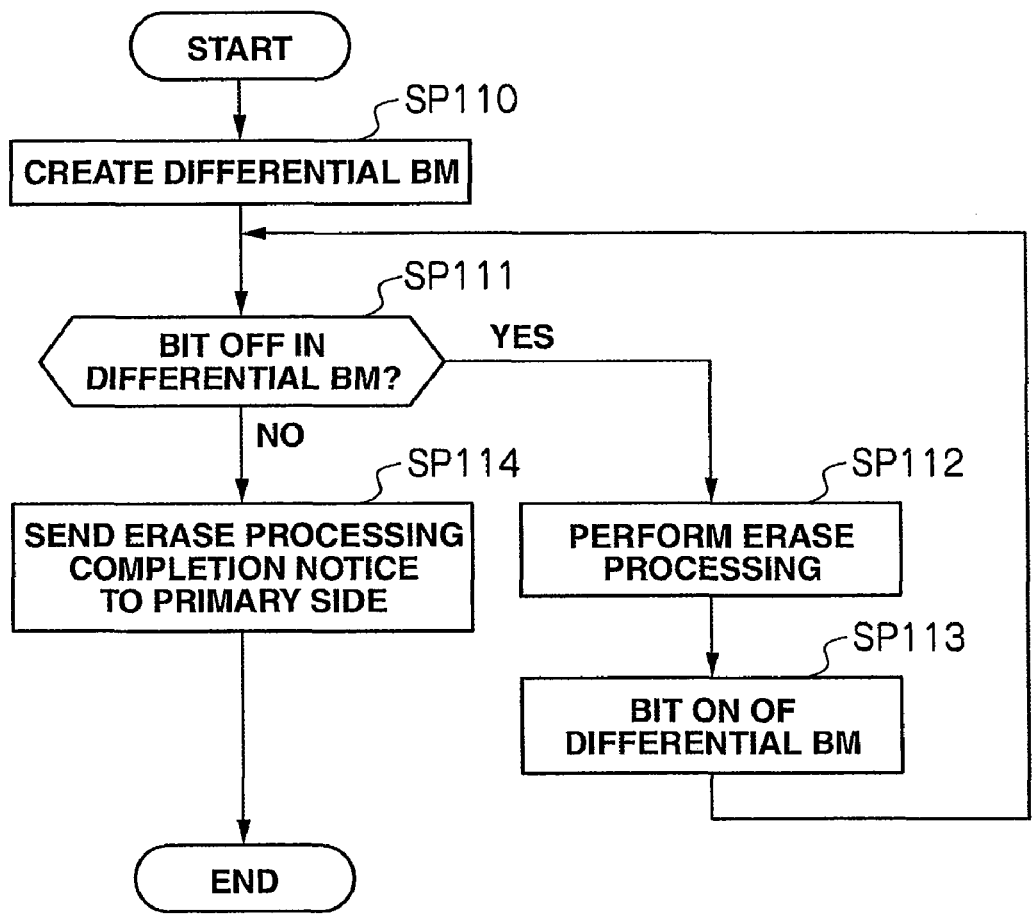
FIG. 17 is a flowchart showing the processing contents of second erase processing.

Meanwhile, FIG. 17 shows the specific processing contents of the second erase processing to be executed by the secondary-side remote copy controller 13B that received the status change (Dup(Erase)) command and the differential bitmap 20A representing the status of the current primary volume PVOL sent from the primary-side remote copy controller 13A.

When the secondary-side remote copy controller 13B receives the status change (Dup(Erase)) command and the differential bitmap 20A sent from the primary-side remote copy controller 13A, it starts the second erase processing illustrated in FIG. 17, and foremost creates a secondary storage apparatus 2B-side differential bitmap 20B in the shared memory 16B by copying the differential bitmap 20A (SP110).

Subsequently, the secondary-side remote copy controller 13B determines whether a bit that has been turned off exists in the differential bitmap 20B created at step SP110 (SP111).

Here, to obtain a positive result in this determination implies that an unupdated area to which data was not copied in the initial copy exists in the secondary volume SVOL. Thereby, the secondary-side remote copy controller 13B implements erase processing for initializing the area corresponding to such bit in the secondary volume SVOL (SP112), turns on the bit (bit corresponding to the area subject to erase processing) in the differential bitmap 20B (SP113), and then returns to step SP111. The secondary-side remote copy controller 13B thereafter repeats the foregoing processing (SP111 to SP113-SP111) until it obtains a negative result at step SP111.

When the secondary-side remote copy controller 13B eventually obtains a negative result at step SP111 as a result of all bits in the differential bitmap 20B being turned on, it sends the foregoing erase processing completion notice to the primary-side remote copy controller 13A (refer to step SP102 of FIG. 16) (SP114), and then ends this second erase processing.

(3) Effect of Present Embodiment

In the foregoing configuration, when the update bitmaps 22A, 22B are set regarding the logical volume VOL in the respective storage apparatuses 2A, 2B, the storage system 1 manages the areas in the logical volume VOL to which valid data was written by the hosts 4A, 4B using the update bitmaps 22A, 22B. Further, when valid data copy is set as the copy method of initial copy, during the initial copy, the storage system 1 creates a differential bitmap 20A reflecting the contents of the update bitmap 22A on the side of the primary storage apparatus 2A, and further creates a differential bitmap 20B merged with the differential bitmap 20A on the side of the secondary storage apparatus 2B, sends only the valid data to the secondary storage apparatus 2B using the differential bitmap 20A on the side of the primary storage apparatus 2A, and manages the areas to which the valid data in the secondary volume SVOL was copied using the differential bitmap 20B on the side of the secondary storage apparatus 2B.

Accordingly, since the storage system 1 is able to determine the status of the valid data that has not been copied to the secondary volume SVOL based on the secondary storage apparatus 2B-side differential bitmap 20B, it is possible to effectively prevent the copy omission of valid data, and thereby realize a copy system and a copy method capable of performing initial copy in a short amount of time and with high reliability.

(4) Other Embodiments

Incidentally, in the foregoing embodiment, although a case was explained where three types of copy methods; namely, valid data copy, data guarantee copy and conventional copy could be used as the copy method of initial copy between the storage apparatuses 2A, 2B, the present invention is not limited thereto, and, if only the valid data copy is to be used as the copy method of initial copy, initial copy based on the other copy methods may or may not be performed.

Further, in the foregoing embodiment, although a case was explained where the primary storage apparatus 2A creates the differential bitmap 20A reflecting the contents of the update bitmap 22A so as to enable differential copy with the secondary storage apparatus 2B based on the differential bitmap 20A, the present invention is not limited thereto, and, without creating the differential bitmap 20A, differential copy may be performed with the secondary storage apparatus 2B using the update bitmap 22A as is. Nevertheless, as a result of creating the differential bitmap 20A, since it is possible to recognize the area storing the valid data in the primary volume PVOL on the side of the first storage apparatus 2A based on the update bitmap 22A even after the initial copy is complete, there is an advantage in that it is possible to perform differential copy once again to another secondary volume SVOL.

Moreover, in the foregoing embodiment, although a case was explained where a plurality of components, such as the disk controllers 18A, 18B and the remote copy controllers 13A, 13B, are used to control the update processing of the update bitmap 22A, 22B, various types of processing before the initial copy and the initial copy processing, the present invention is not limited thereto, and a processor for collectively controlling such processing may be additionally provided.

Further, in the foregoing embodiment, although a case was explained where, upon initial copy, copying of the valid data from the primary volume PVOL to the secondary volume SVOL was primarily handled by the primary storage apparatus 2A in order to send the valid data from the primary storage apparatus 2A to the secondary storage apparatus 2B, the present invention is not limited thereto, and copying of the valid data from the primary volume PVOL to the secondary volume SVOL can be primarily handled by the secondary storage apparatus 2B such that the secondary storage apparatus 2B reads the valid data from the primary storage apparatus 2A.

Moreover, in the foregoing embodiment, although a case was explained where this invention was applied to the remote copy between the storage apparatuses 2A, 2B, the present invention is not limited thereto, and this invention may also be applied to the internal copy to be performed in a single storage apparatus 2A, 2B.

The present invention may be broadly applied to a copy system of various configurations that copies data written from a host in a primary-side first volume to a secondary-side second volume synchronously or asynchronously with the writing of such data.

We claim:

1. A copy system for copying data written from a host into a first volume on a primary system to a second volume on a secondary system synchronously or asynchronously with writing of said data, comprising:
   a first control unit provided to said primary system for using a first bitmap to reflect changes to an area in said first volume to which data was written from said host, creating a second bitmap reflecting contents of said first bitmap during initial copy that matches contents of said first and second volumes prior to said copy, sending said second bitmap to said secondary system, and copying to said second volume only valid data containing data written by said host in said first volume based on said second bitmap; and
   a second control unit provided to said secondary-system for creating a third bitmap, contents of which is merged with contents of said second bitmap sent from said primary-system, and reflecting a differential indicating differences in content between said first and second volumes during said initial copy based on said third bitmap.

2. The copy system according to claim 1, wherein said second control unit sends said third bitmap to said first control unit after said initial copy is complete; and
   wherein said first control unit verifies the data in said second volume based on said third bitmap and, when there is said valid data that has not been copied to said second volume, executes data guarantee processing for verifying whether copying said valid data to said second volume was properly performed.

3. The copy system according to claim 2, wherein said initial copy includes:
   a first copy process where said first control unit creates said second bitmap, the contents of which is merged with the contents of said first bitmap, copies to said second volume only said valid data in said first volume based on said second bitmap, and executes said data guarantee processing after said initial copy is complete;
   a second copy process where said first control unit creates said second bitmap with all areas of said first volume as a differential indicating the differences in content between said first and second volumes, copies all areas of said first volume to said second volume based on said second bitmap, and executes said data guarantee processing after said initial copy is complete; and
   a third copy process where data of all areas in said first volume is copied to said second volume, and said data guarantee processing is not executed;
   wherein said first control unit selects a copy process of said initial copy among said first to third copy processes according to a pre-set copy process of said initial copy and a current status of said first bitmap.

4. The copy system according to claim 3, wherein said first control unit selects said second copy method as the copy method of said initial copy even when said first copy process is set as the copy process of said initial copy if the volume size of said first volume is smaller than a given size or if said valid data exceeding an amount of data that can be written in a predetermined volume is written in said first volume.

5. The copy system according to claim 1, wherein said second control unit initializes an area to which said valid data in said second volume was not copied after said initial copy is complete.

6. A copy method for copying data written from a host into a first volume on a primary-system to a second volume on a secondary-system synchronously or asynchronously with the writing of said data, comprising:
   a first step on said primary system of using a first bitmap to reflect changes in an area in said first volume to which data was written from said host;
   a second step on said primary system of creating a second bitmap reflecting contents of said first bitmap during initial copy that matches contents of said first and second volumes prior to said copy, and sending said second bitmap to said secondary system on said primary-system, and on said secondary system of creating a third bitmap, contents of which is merged with contents of said second bitmap sent from said primary-system; and
   a third step on said primary-system of copying to said second volume only valid data containing data written by said host in said first volume based on said second bitmap, and on said secondary-system of reflecting a differential indicating the differences in content between said first and second volumes during said initial copy based on said third bitmap.

7. The copy method according to claim 6, further comprising:
a fourth step of sending said third bitmap to said first control unit after said initial copy is complete, and on said primary system for verifying the data in said second volume based on said third bitmap and, when there is said valid data that has not been copied to said second volume, executing data guarantee processing for verifying whether copying said valid data to said second volume was properly performed.

8. The copy method according to claim 7, comprising as copy methods of said initial copy:
a first copy method on said primary-system of creating said second bitmap, the contents of which is merged with the contents of said first bitmap, copying to said second volume only said valid data in said first volume based on said second bitmap, and executing said data guarantee processing after said initial copy is complete;
a second copy method on said primary-system of creating said second bitmap with all areas of said first volume as a differential indicating the differences in content between said first and second volumes, copying all areas of said first volume to said second volume based on said second bitmap, and executing said data guarantee processing after said initial copy is complete; and
a third copy method of copying data of all areas in said first volume to said second volume, and not executing said data guarantee processing;
wherein on said primary system a copy method of said initial copy is selected among said first to third copy methods according to a pre-set copy method of said initial copy and current status of said first bitmap.

9. The copy method according to claim 8, wherein on said primary-system said second copy method is selected as a copy method of said initial copy even when said first copy method is set as the copy method of said initial copy if the volume size of said first volume is smaller than a given size or if said valid data exceeding an amount of data that can be written in a predetermined volume is written in said first volume.

10. The copy method according to claim 6, further comprising:
a fourth step of initializing an area to which said valid data in said second volume was not copied after said initial copy is complete.

* * * * *